United States Patent
Terasawa et al.

(10) Patent No.: US 6,295,843 B1
(45) Date of Patent: Oct. 2, 2001

(54) METHOD OF MAKING A SINGLE-MODE OPTICAL FIBER WITH MULTIPLE CONCENTRIC CORE PORTIONS BY USING AN OUTSIDE VAPOR DEPOSITION PROCESS

(75) Inventors: Yoshiaki Terasawa; Yuji Takahashi; Takatoshi Kato, all of Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 09/535,533

(22) Filed: Mar. 27, 2000

Related U.S. Application Data

(62) Division of application No. 09/054,494, filed on Apr. 3, 1998, now Pat. No. 6,062,046, which is a division of application No. 08/725,903, filed on Oct. 4, 1996, now Pat. No. 5,822,488.

(30) Foreign Application Priority Data

Oct. 4, 1995 (JP) .................................................. 7-257843

(51) Int. Cl.$^7$ .................................................. C03B 37/027
(52) U.S. Cl. .................................................. 65/421; 65/422
(58) Field of Search .................................................. 65/421, 422

(56) References Cited

U.S. PATENT DOCUMENTS

| | | | |
|---|---|---|---|
| 3,932,162 | 1/1976 | Blankenship | 65/421 |
| 4,000,416 | 12/1976 | Goell | 385/127 X |
| 4,149,772 | 4/1979 | Iyengar et al. | 385/127 X |
| 4,161,505 | * 7/1979 | Shiraishi | 65/422 |
| 4,165,223 | * 8/1979 | Powers | 65/421 |
| 4,242,375 | 12/1980 | Shiraishi | 65/417 |
| 4,251,251 | * 2/1981 | Blankenship . | |
| 4,266,851 | 5/1981 | Salisbury | 385/127 X |
| 4,298,365 | * 11/1981 | Bailey | 65/422 |
| 4,372,648 | 2/1983 | Black | 385/127 X |

(List continued on next page.)

FOREIGN PATENT DOCUMENTS

| | | | |
|---|---|---|---|
| 159046 | 10/1985 | (EP) . | |
| 53138354 | * 12/1978 | (JP) | 65/421 |
| 5546980 | 11/1980 | (JP) . | |

OTHER PUBLICATIONS

Bjarklev, "Relation Between Macrobending Losses and Cut-off Wavelength in Dispersion–Shifted Segmented–Core Fibres", Electronics Letters, May 22, 1986, vol. 22, No. 11, pp. 574–575.

(List continued on next page.)

*Primary Examiner*—John Hoffmann
(74) *Attorney, Agent, or Firm*—Pillsbury Winthrop LLP

(57) ABSTRACT

The present invention relates to a single-mode optical fiber having a configuration which enables lowering of dispersion slope while securing a sufficient MFD. This single-mode optical fiber has a refractive index profile in which an indent with a sufficient width is provided at the center of its core region. In particular, this indent satisfies the following relationship:

$$a \cdot (\Delta n_2 - \Delta n_1)/(b \cdot \Delta n_2) \geq 0.04$$

when the first core portion in the single-mode optical fiber has a mean relative refractive index difference of $\Delta n_1$ with respect to the cladding portion and an outer diameter of a while the second core portion has a mean relative refractive index difference of $\Delta n_2$ with respect to the cladding portion and an outer diameter of b.

1 Claim, 15 Drawing Sheets

U.S. PATENT DOCUMENTS

| | | | |
|---|---|---|---|
| 4,436,368 | 3/1984 | Keck | 385/126 X |
| 4,641,917 | 2/1987 | Glodis et al. | 385/127 X |
| 4,715,679 | 12/1987 | Bhagavatula | 385/127 X |
| 4,737,179 | 4/1988 | Tanaka | 65/415 |
| 4,755,022 | 7/1988 | Ohashi et al. | 350/96.33 |
| 4,852,968 | 8/1989 | Reed | 350/96.33 |
| 5,013,131 | 5/1991 | Fotheringham | 385/126 X |
| 5,555,340 | 9/1996 | Onishi et al. | 385/126 X |
| 5,675,690 | 10/1997 | Nouchi et al. | 385/127 |
| 5,684,909 | 11/1997 | Liu | 385/127 |
| 5,702,497 | 12/1997 | Oh | 65/412 |

OTHER PUBLICATIONS

Croft et al, "Low–Loss Dispersion–Shifted Single–mode Fiber Manufactured by the OVD Process", Journal Of Lightwave Technology, vol. LT–3, No. 5, Oct. 1985, pp. 931–934.

Liu et al, "Large Effective Area Dispersion–Shifted Fibers With Dual–Ring Index Profiles", OFC '96 Technical Digest, Wednesday Afternoon, pp. 165–166.

Nouchi et al, "New Dispersion Shifted Fiber With Effective Area Larger Than $90/\mu m^2$", 22nd European Conference On Optical Communication, pp. 1.49–1.52.

\* cited by examiner

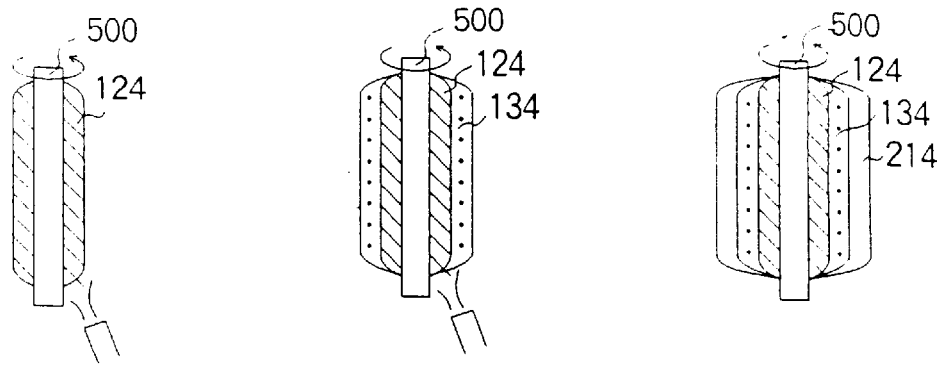
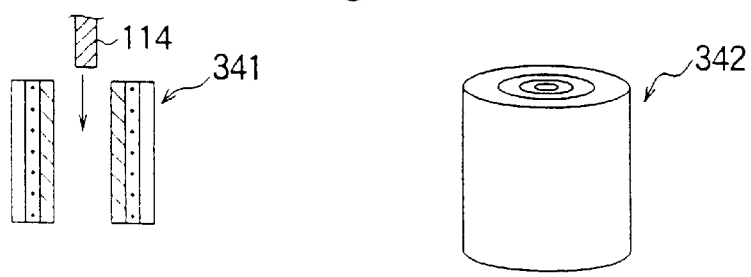
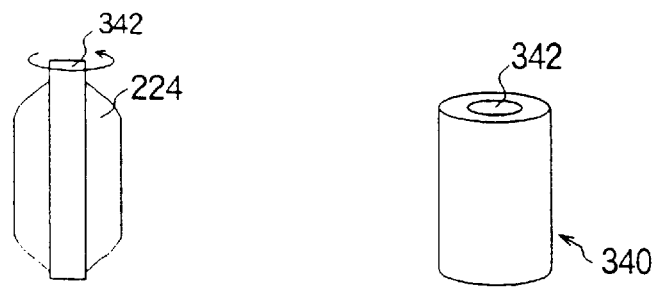
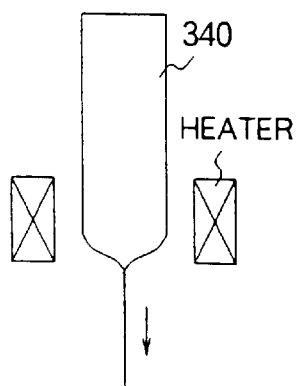

$\dfrac{a \cdot (\Delta n2 - \Delta n1)}{b \cdot \Delta n2}$ $\dfrac{(Ca-b)(\Delta n3b - \Delta n3a)}{C \cdot \Delta n3b}$

METHOD OF MAKING A SINGLE-MODE OPTICAL FIBER WITH MULTIPLE CONCENTRIC CORE PORTIONS BY USING AN OUTSIDE VAPOR DEPOSITION PROCESS

This is a division of application Ser. No. 09/054,494, filed Apr. 3, 1998, now U.S. Pat. No. 6,062,046 which is a division of application Ser. No. 08/725,903, filed Oct. 4, 1996, U.S. Pat. No. 5,822,488.

BACKGROUND OF THE INVENTION

1. Field of the Invention

The present invention relates to a single-mode optical fiber suitable for a transmission line in digital communications and a method of fabricating the same.

2. Related Background Art

Conventionally, in optical communication systems adopting a single-mode optical fiber (referred to as "SM optical fiber" hereinafter) as their transmission line, light of 1.3-$\mu$m wavelength band or 1.55-$\mu$m wavelength band has often been used. Recently, from the viewpoint of lowering transmission loss, the use of 1.55-$\mu$m wavelength band light has been increasing. Such an SM optical fiber applied to transmission lines for 1.55-$\mu$m wavelength band light (referred to as "1.55-$\mu$m SM optical fiber" hereinafter) has been designed such that its wavelength dispersion (phenomenon in which pulse wave broadens due to the fact that velocity of propagation of light varies according to wavelength) becomes zero (a dispersion-shifted fiber whose zero dispersion wavelength is set 1.55 $\mu$m). Currently, as such a dispersion-shifted fiber, optical fibers having a refractive index profile of a dual-shape type such as that disclosed in Japanese Patent Publication No. Hei 3-18161 or a segmented-core type disclosed in "Relation between Macrobending Losses and Cutoff Wavelength in Dispersion-Shifted Segmented-Core Fiber," *Electronics Letter*, No. 22, No. 11, p. 574, 1986 have been mainly used.

Also, in recent years, as long-distance transmission has become possible because of the advent of optical amplifier, in order to prevent the four-lightwave mixing, which is one of nonlinear optical effects, there has also been used an optical fiber in which the above-mentioned refractive index profile is modified so as to shift the zero dispersion wavelength from 1.55 $\mu$m to the shorter or longer wavelength side. Here, the nonlinear optical effects refer to phenomenons in which signal light pulse is distorted in proportion to density or the like of optical intensity. They become a factor restricting the transmission rate.

SUMMARY OF THE INVENTION

It is an object of the present invention to provide a single-mode optical fiber having a configuration which realizes both reducing of dispersion slope and a sufficient mode-field diameter, and a method of fabricating the same. In order to attain such a single-mode optical fiber, the inventors have studied the conventional single-mode optical fiber as explained in the following.

Since the conventional 1.55-$\mu$m SM optical fiber has a zero dispersion wavelength set near 1.55 $\mu$m, the wavelength dispersion thereof gradually increases as the signal light wavelength deviates farther from 1.55 $\mu$m. In particular, in the case where the absolute value of its dispersion slope (e.g., differential coefficient, at the zero dispersion wavelength, of a curve indicating dispersion with respect to the signal light wavelength shown in each of FIGS. 13 and 14) is large, the ratio of increase in the absolute value of wavelength dispersion unfavorably becomes higher when the zero dispersion wavelength of the SM optical fiber or the wavelength of a light source deviates from 1.55 $\mu$m. Also, in long-distance transmission, since a wavelength dispersion is intentionally generated in order to suppress the above-mentioned nonlinear optical effects, dispersion-shifted fibers in general are designed such that the zero dispersion wavelength thereof is slightly shifted from the signal light wavelength. Accordingly, in the SM optical fiber, which is a transmission line, it is necessary to lower the absolute value of dispersion slope or to effect dispersion compensation (in which signal light is made to pass through an SM optical fiber having a reverse dispersion characteristics) in the transmission line.

In wavelength-divided multiplex transmission (referred to as "WDM" hereinafter) in which a plurality of wavelengths are transmitted as being overlaid on each other in order to increase the transmission rate, since a plurality of wavelengths near the zero dispersion wavelength are used, when the dispersion slope has a large absolute value, the difference among wavelength dispersion values at respective wavelengths may increase so much that dispersion cannot be compensated for. Accordingly, it is important to lower the absolute value of dispersion slope.

In the refractive index profile of the conventional dual shape type or segmented-core type, as the absolute value of dispersion slope is made smaller, the mode-field diameter (referred to as "MFD" hereinafter) decreases or the bending loss increases, thereby making it inevitable for the lateral-pressure characteristic to deteriorate. As the connection characteristic deteriorates when the MFD is made too small, the lower limit thereof has conventionally been set. Also, in long-distance transmission using a light amplifier, nonlinear phenomenons are enhanced as MFD is lowered, thereby demanding increase in MFD. Also, deterioration in the side-pressure characteristic becomes an obstacle when SM optical fibers are formed into a cable. Accordingly, it is important to note that the reducing in absolute value of dispersion slope and the increase in MFD have a trade-off relationship therebetween.

In the refractive index profile of dual shape type or segmented-core type, the refractive index near the center of core region has a constant value or decreases toward the outside. The core of an SM optical fiber having such a refractive index profile comprises an inner core at the center portion thereof and an outer core having a lower refractive index than the inner core. In order to decrease the absolute value of dispersion slope in this refractive index profile, the following three kinds of methods have been known:

(1) Increase the outer core.
(2) Increase the ratio of inner core diameter/outer core diameter.
(3) Decrease relative refractive index difference of the inner core with respect to pure silica glass (where the outer core has a lower refractive index than that of the inner core).

Nevertheless, the method of (1) leads to decrease in MFD, whereas the methods of (2) and (3) cause bending loss (increase in transmission loss in the state where the optical fiber is bent) to increase.

The single-mode optical fiber (SM optical fiber) according to the present invention has a specific configuration in order to overcome the foregoing problems. Specifically, as shown in FIG. 1, an SM optical fiber 1 according to the present invention is an optical fiber mainly composed of silica glass, comprising a core region having a predetermined refractive index and a cladding portion 200 which is formed around the outer periphery of the core region and whose refractive index is set lower than that of the core region. The core region comprises a first core portion 110 whose mean relative refractive index difference with respect to the cladding portion 200 is a first value $\Delta n_1$ and whose outer diameter is a; a second core portion 120 which is a glass region whose mean relative refractive index difference with respect to the cladding portion 200 is a second value $\Delta n_2$ greater than the first value $\Delta n_1$ and whose outer diameter is b, formed around the outer periphery of the first core portion 110; and a third core portion 130 which is a glass region whose mean relative refractive index difference with respect to the cladding portion 200 is a third value $\Delta n_3$ which is smaller than the second value $\Delta n_2$ and whose outer diameter is c, formed around the outer periphery of the second core portion 120.

In particular, in the SM optical fiber 1 according to the present invention, the first core portion 110 and the second core portion 120 satisfy the following relationship:

$$a \cdot (\Delta n_2 - \Delta n_1)/(b \cdot \Delta n_2) \geq 0.04 \quad (1)$$

therebetween.

Here, the refractive index profile 600 of the SM optical fiber 1 does not always have a clear step-like form. In such a case, the outer diameter a of the first core portion 110 is defined by a diameter in the boundary portion between the first core portion 110 and the second core portion 120 at which the relative refractive index difference is $(\Delta n_1 + \Delta n_2)/2$; the outer diameter b of the second core portion 120 is defined by a diameter in the boundary portion between the second core portion 120 and the third core portion 130 at which the relative refractive index difference is $(\Delta n_2 + \Delta n_3)/2$; and the outer diameter c of the second core portion 130 is defined by a diameter in the boundary portion between the third core portion 130 and the cladding portion 200 at which the relative refractive index difference is $(\Delta n_3 + \Delta n_c)/2$. Here, in the specification, since the mean relative refractive index differences of the respective glass regions 110, 120, and 130 are defined on the basis of the refractive index of the cladding portion 200, the mean relative refractive index difference $\Delta n_c$ of the cladding portion 200 with respect to itself is 0.

Normally, in the SM optical fiber, two phenomenons, namely, a material dispersion in which velocity of propagation toward the longitudinal direction (direction in which signal light advances) becomes faster as the signal light has a longer wavelength and a structure dispersion in which velocity of propagation becomes faster as the signal light has a shorter wavelength, occur concurrently. Accordingly, such an SM optical fiber has a refractive index profile in which the refractive index near the core center has a constant value or decreases toward the outside. Here, gradients of the material dispersion and structure dispersion with respect to wavelength have polarities opposite to each other, while the material dispersion normally has a larger absolute value of gradient. Accordingly, in such an SM optical fiber, the total dispersion obtained as the material dispersion and structure dispersion are added together has a unique gradient (dispersion slope) inherent in each SM optical fiber with respect to the zero dispersion wavelength.

The inventors have found out that, in the core portion of SM optical fibers having a refractive index profile of dual shape type or segmented-core type, when the relative refractive index difference of the center part of the core with respect to the cladding portion is reduced as compared with that of the core at the peripheral part, the absolute value of dispersion slope can be reduced without decreasing MFD or increasing the bending loss. Namely, in the refractive index profile, according as the region (indent indicated by mark "A" in the refractive index profile of FIG. 1) corresponding to the center part of the core is wider and deeper (a difference between the first and second values $\Delta n_1$ and $\Delta n_2$ is larger), the absolute value of dispersion slope can be reducer. In particular, the inventors have confirmed that the width of this indent A has a great effect on reducing the absolute value of dispersion slope, such that, when the width of this indent is insufficient (narrow), the effect on reducing the absolute value of dispersion slope can hardly be obtained. In this specification, "dispersion slope" used alone indicates its absolute value.

As disclosed in "Low-Loss Dispersion-Shifted Single-Mode Fiber Manufactured by the OVD Process," *Journal of Lightwave Technology*, Vol. LT-3, No. 5, p. 931, 1985, it has been known that a deep crack is formed at the region corresponding to the center part of the core portion in the refractive index profile of an SM optical fiber manufactured by OVD (outside Vapor Deposition) method. This crack, however, is not intended for reducing the dispersion slope (absolute value of dispersion slope). Rather, it is non-intentionally generated as a matter of convenience in manufacture, and the aimed effects of the present invention cannot be expected since the width of this crack is too narrow. Also, though a crack such as that mentioned above is generated in MCVD (Modified Chemical Vapor Deposition) method, no effect on reducing the dispersion slope can be expected for the same reasons as those of the above-mentioned OVD method.

In the SM optical fiber 1 according to the present invention, by contrast, since the indent A in its refractive index profile 600 has a sufficient width (since the first core portion 110 and the second core portions 120 satisfy the above-mentioned relationship (1)), the absolute value of gradient of structure dispersion with respect to wavelength becomes smaller, thereby enabling the reducing of dispersion slope in a wide wavelength range.

Here, in order to attain a greater effect on reducing the dispersion slope as compared with the conventional SM optical fiber, it is preferable that the third value $\Delta n_3$ be set to 0.03% or higher, and the second value $\Delta n_2$ be set to 0.4% or higher.

Also, the inventors have confirmed that, according to the requirement (that bending loss at a diameter of 32 mm (referred to as "32 mm$\phi$ bending loss" hereinafter) be 0.50 dB/turn or less with respect to light having a wavelength of 1,550 nm) indicated in Standard 4.2.6 Fiber Macrobend (Generic Requirement for Optical Fiber and Fiber Optic Cable, GR-20-CORE, Issue 1, September 1994) published by Bellcore of USA, b/c$\leq$0.4. Here, since the cut-off wavelength becomes longer than the wavelength of the intended signal light when b/c$\leq$0.1, it is preferable that 0.1$\leq$b/c$\leq$0.4. Further, the second core portion 120 and the third core portion 130 preferably satisfy the relationship of 0.1$\leq$b/c$\leq$0.3 therebetween. It is due to the fact that the bending loss at a diameter of 30 mm (30 mm$\phi$ bending loss) of 0.1 dB/turn or less is generally recognized as a standard for preventing the transmission loss from increasing in the SM optical fiber applied to a cable of a tight configuration.

Also, the inventors have confirmed that, as the value of the above-mentioned relational expression (1) is increased, the effect on reducing the dispersion slope is maximized at about 0.5, whereas the dispersion slope rather increases thereafter (see FIG. 15). Accordingly, the first core portion 110 and the second core portion 120 preferably satisfy the following relationship:

$$a \cdot (\Delta n_2 - \Delta n_1)/(b \cdot \Delta n_2) \leq 0.5 \quad (2)$$

therebetween.

Further, in the SM optical fiber 1 according to the present invention, as shown in FIG. 3, the third core portion 130 is preferably constituted by an inner core 130a which is a glass region whose mean relative refractive index difference with respect to the cladding portion 200 is a fourth value $\Delta n_{3a}$ (<$\Delta n_2$) and whose outer diameter is $c_a$ (<c) formed around the outer periphery of the second core portion 120 and an outer core 130b which is a glass region whose mean relative refractive index difference with respect to the cladding portion 200 is a fifth value $\Delta n_{3b}$ (<$\Delta n_2$ and >$\Delta n_{3a}$) and whose outer diameter is c spaced from the second core portion 120 by way of the inner core 130a. In other words, in the refractive index profile 700 of FIG. 3, an indent B is formed at a region corresponding to the third core portion 130 (including the inner core 130a and the outer core 130b). Here, the inner core 130a and the outer core 130b satisfy the following relationship:

$$0.1 \leq (c_a - b) \cdot (\Delta n_{3b} - \Delta n_{3a})/(c \cdot \Delta n_{3b}) \leq 0.8 \quad (3)$$

therebetween.

When the indent B having sufficient width and depth is provided in the profile region corresponding to the third core portion 130, as in the case of the effect obtained by the above-mentioned indent A, seepage of light into the cladding portion 200 can be made greater, thereby decreasing the gradient (absolute value) of structure dispersion with respect to wavelength and consequently reducing the dispersion slope.

An effect on reducing the dispersion slope is obtained at the lower limit of the above relational expression (3) or higher, while being maximized at the upper limit thereof. Beyond this upper limit, the dispersion slope rather increases (see FIG. 16).

The first method of manufacturing the SM optical fiber according to the present invention comprises, as shown in FIG. 5, a first step of preparing a glass tube 201 which is to be the cladding portion 200 having a predetermined refractive index, and flowing a material gas containing at least Si and Ge through a hollow part of the glass tube 201, while heating the glass tube 201, thereby forming, on the inner surface of the glass tube 201, a first soot body 131 which is to be the third core portion 130 after vitrification, the third core portion having a mean relative refractive index difference with respect to the cladding portion 200 of the third value $\Delta n_3$; a second step of flowing a material gas containing at least Si and Ge through the hollow part of the glass tube 201 in which the first soot body 131 is formed, while heating the glass tube 201, thereby forming, on the inner surface of the first soot body 131, a second soot body 151 which is to be the first core portion 110 and the second core portion 120 after vitrification, the second core portion having a mean relative refractive index difference with respect to the cladding portion 200 of the second value $\Delta n_2$ (>$\Delta n_3$), the first core portion 110 having a mean relative refractive index difference with respect to the cladding portion 200 of the first value $\Delta n_1$ (<$\Delta n_2$); a third step of flowing a halogen gas through the hollow part of the glass tube 201 in which the first soot body 131 and the second soot body 151 are formed, while heating the glass tube 201, thereby diffusing germanium contained in the inner surface side of the second soot body 151 so as to form an inner region 111 and an outer region 121 respectively having the germanium concentrations different from each other; a fourth step of heating and collapsing the glass tube 210 in which the first soot body 131 and the inner and outer regions 111 and 121 of the second soot body 151 are formed, thereby obtaining a transparent optical fiber preform 310; and a fifth step of drawing one end of thus obtained optical fiber preform 310 while heating it, thereby yielding the SM optical fiber 1 having the refractive index profile 600 shown in FIGS. 1 and 2A–2C.

This first manufacturing method belongs to the MCVD method. In particular, in the third step, a halogen gas such as chlorine is flowed through the hollow part of the glass tube 201, while the latter is heated, so as to diffuse germanium on the inner surface side of the second soot body 151, thereby intentionally reducing the relative refractive index difference of the inner region 111 to be the first core portion 110 after vitrification with respect to that of the outer region 121 to be the second core portion 120 after vitrification. Accordingly, thus obtained SM optical fiber 1 has a refractive index profile 600 in which the indent A with a sufficient width is formed at the center part of the core region.

Here, in order to obtain the SM optical fiber 1 having the refractive index profile 700 shown in FIGS. 3 and 4A–4C, the above-mentioned third step is effected at the above-mentioned first step.

The second method of manufacturing the SM optical fiber according to the present invention comprises, as shown in FIG. 7, a first step of forming a first soot body 112 to be the first core portion 110 after vitrification, the first core portion 110 having a mean relative refractive index difference with respect to the cladding portion 200 of the first value $\Delta n_1$; a second step of forming, around the outer periphery of the first soot body 112, a second soot body 122 to be the second core portion 120 after vitrification, the second core portion 120 having a mean relative refractive index difference with respect to the cladding portion 200 of the second value $\Delta n_2$ (>$\Delta n_1$); a third step of forming, around the outer periphery of the second soot body 122, a third soot body 132 to be the third core portion 130 after vitrification, the third core portion 130 having a mean relative refractive index difference with respect to the cladding portion 200 of the third value $\Delta n_3$ (<$\Delta n_2$); a fourth step of forming, around the outer periphery of the third soot body 132, a fourth soot body 212 to be the cladding portion 200 having a predetermined refractive index after vitrification; a fifth step of heating and collapsing a composite soot body 321 formed at the fourth step, thereby obtaining a transparent optical fiber preform 320; and a sixth step of drawing one end of thus obtained optical fiber preform 320 while heating it, thereby yielding the SM optical fiber 1 having the refractive index profile 600 shown in FIGS. 1 and 2A–2C.

This second manufacturing method belongs to the VAD method. In particular, in the first step, a portion which is to be the first core portion 110 after vitrification and is for forming the indent A with a sufficient width in the refractive index profile 600 is intentionally formed. Accordingly, thus obtained SM optical fiber 1 has a refractive index profile 600 in which the indent A with a sufficient width is formed at the center portion of the core region.

Here, in order to obtain the SM optical fiber 1 having the refractive index profile 700 shown in FIGS. 3 and 4A–4C, the third step is constituted by a first sub-process of forming, around the outer periphery of the second soot body 122, an inner soot body to be the inner core 130a of the third core portion 130 after vitrification, the inner core 130a being formed around the outer periphery of the second core portion 120 and having a mean relative refractive index difference with respect to the cladding portion 200 of the fourth value $\Delta n_{3a}$ (<$\Delta n_2$); and a second sub-process of forming, around the outer periphery of the inner soot body to be an outer core 130b of the third core portion 130 after vitrification, the outer core 130b being formed around the outer periphery of the inner core 130a and having a mean relative refractive index difference with respect to the cladding portion 200 of the fifth value $\Delta n_{3b}$ (<$\Delta n_2$ and >$\Delta n_{3a}$).

The third method of manufacturing the SM optical fiber according to the present invention comprises, as shown in FIG. 9, a first step of forming, around the outer periphery of a cylindrical glass rod 500, a first soot body 153 to be the first core portion 110 and the second core portion 120 after vitrification, the first core portion 110 having a mean relative refractive index difference with respect to the cladding portion 200 of the first value $\Delta n_1$, the second core portion 120 having a mean relative refractive index difference with respect to the cladding portion 200 of the second value $\Delta n_2$ (>$\Delta n_1$); a second step of forming, around the outer periphery of the first soot body 153, a second soot body 133 to be the third core portion 130 after vitrification, the third core portion having a mean relative refractive index difference with respect to the cladding portion 200 of the third value $\Delta n_3$ (<$\Delta n_2$); a third step of forming, around the outer periphery of the second soot body 133, a third soot body 213 to be the cladding portion 200 having a predetermined refractive index after vitrification; a fourth step of pulling out the glass rod 500 and flowing a halogen gas through a hollow part of a tubular soot body 331 comprising the first soot body 153, second soot body 133, and third soot body 213, while heating the tubular soot body 331, thereby diffusing germanium contained in the inner surface side of the first soot body 153 so as to obtain an inner soot body 113 and an outer soot body 123 respectively having the germanium concentrations different from each other; and a fifth step of heating and collapsing this tubular soot body 331 so as to obtain a transparent optical fiber preform 330; and a sixth step of drawing one end of thus obtained optical fiber preform 330 while heating it, thereby yielding the SM optical fiber 1 having the refractive index profile 600 shown in FIGS. 1 and 2A–2C.

This third manufacturing method belongs to the OVD method. In particular, in the fourth step, a halogen gas such as chlorine is flowed through the hollow part of the tubular soot body 331, while the latter is heated, so as to diffuse germanium on the inner surface side of the first soot body 153, thereby intentionally reducing the germanium concentration of the inner soot body 113 as compared with that of the outer soot body 123. Accordingly, thus obtained SM optical fiber 1 has a refractive index profile 600 in which the indent A with a sufficient width is formed at the center portion of the core region.

Here, in order to obtain the SM optical fiber 1 having the refractive index profile 700 shown in FIGS. 3 and 4A–4C, the second step is constituted by a first sub-process of forming, around the outer periphery of the first soot body 153, an inner soot body to be the inner core 130a of the third core portion 130 after vitrification, the inner core 130a being formed around the outer periphery of the second core portion 120 and having a mean relative refractive index difference with respect to the cladding portion 200 of the fourth value $\Delta n_{3a}$ (<$\Delta n_2$); and a second sub-process of forming, around the outer periphery of the inner soot body, an outer soot body to be an outer core 130b of the third core portion 130 after vitrification, the outer core 130b being formed around the outer periphery of the inner core 130a and having a mean relative refractive index difference with respect to the cladding portion 200 of the fifth value $\Delta n_{3b}$ (<$\Delta n_2$ and >$\Delta n_{3a}$).

The fourth method of manufacturing the SM optical fiber according to the present invention comprises, as shown in FIG. 11, a first step of forming, around the outer periphery of the cylindrical glass rod 500, a first soot body 124 to be the second core portion 120 after vitrification, the second core portion 120 having a mean relative refractive index difference with respect to the cladding portion 200 of the second value $\Delta n_2$; a second step of forming, around the outer periphery of the first soot body 124, a second soot body 134 to be the third core portion 130 after vitrification, the third core portion 130 having a mean relative refractive index difference with respect to the cladding portion 200 of the third value $\Delta n_3$ (>$\Delta n_2$); a third step of forming, around the second soot body 134, a third soot body 214 to be the cladding portion 200 having a predetermined refractive index after vitrification; a fourth step of pulling out the glass rod 500, and heating and sintering the first soot body 124, the second soot body 134, and the third soot body 214; a fifth step of inserting, into a hollow part of a sintered body 341 formed at the fourth step, a cylindrical glass rod 114 to be the first core portion 110 after vitrification, the first core portion 110 having a mean relative refractive index difference with respect to the cladding portion 200 of the first value $\Delta n_1$ (<$\Delta n_2$), and heating and integrating thus formed composite body so as to obtain a transparent optical fiber preform 342; and a sixth step of drawing one end of a finally obtained optical fiber preform 340 while heating it, thereby yielding the SM optical fiber 1 having the refractive index profile 600 shown in FIGS. 1 and 2A–2C.

This fourth manufacturing method belongs to the OVD method. In particular, in the fourth step, the glass rod 114 to be the first core portion 110 after vitrification is inserted into the sintered body 341, and thus formed composite body is integrated so as to obtain the optical fiber preform 340. Accordingly, thus obtained SM optical fiber 1 has a refractive index profile 600 in which the indent A with a sufficient width is formed at the center portion of the core region.

Here, in order to obtain the SM optical fiber 1 having the refractive index profile 700 shown in FIGS. 3 and 4A–4C, the second step is constituted by a first sub-process of forming, around the outer periphery of the first soot body 124, an inner soot body to be an inner core 130a of the third core portion 130 after vitrification, the inner core 130a being formed around the outer periphery of the second core portion 120 and having a mean relative refractive index difference with respect to the cladding portion 200 of the fourth value $\Delta n_{3a}$ (<$\Delta n_2$); and a second sub-process of forming, around the outer periphery of the inner soot body, an outer soot body to be an outer core 130b of the third core portion 130 after vitrification, the outer core 130b being formed around the outer periphery of the inner core 130a and having a mean relative refractive index difference with respect to the cladding portion 200 of the fourth value $\Delta n_{3b}$ (<$\Delta n_2$ and >$\Delta n_{3a}$).

An SM optical fiber 10 according to the second embodiment of the present invention comprises, as shown in FIG. 22, an inner core portion 150 having a mean relative refractive index difference with respect to an outer cladding portion 260 of $\Delta n_4$ and an outer diameter of d; an outer core portion 160 formed around the outer periphery of the inner core portion 150, the outer core portion 160 having a mean relative refractive index difference with respect to the outer cladding portion 260 of $\Delta n_5$ (<$\Delta n_4$) and an outer diameter of e; an inner cladding portion 250 formed around the outer periphery of the outer core portion 160, the inner cladding portion 250 having a mean relative refractive index difference with respect to the outer cladding portion 260 of $\Delta n_6$ ($<\Delta n_5$ and $<0$) and an outer diameter of f; and the outer cladding portion 260 formed around the outer periphery of the inner cladding portion 250, the outer cladding portion 260 having a predetermined refractive index (higher than that of the inner cladding portion 250). Namely, as shown in FIG. 22, this SM optical fiber 10 has a refractive index profile 800 with an indent C.

In particular, the inner cladding portion 250 and the outer cladding portion 260 satisfy the following relationship:

$$e \cdot |\Delta n_6|/(f-e) \geq 0.03$$

therebetween.

Here, the refractive index profile 800 of the SM optical fiber 10 does not always have a clear step-like form. In such a case, the outer diameter d of the inner core portion 150 is defined by a diameter in the boundary portion between the inner core portion 150 and the outer core portion 160 at which the relative refractive index difference is $(\Delta n_4+\Delta n_5)/2$; the outer diameter e of the outer core portion 160 is defined by a diameter in the boundary portion between the outer core portion 160 and the inner cladding portion 250 at which the relative refractive index difference is $(\Delta n_5+\Delta n_6)/2$; and the outer diameter f of the inner cladding portion 250 is defined by a diameter in the boundary portion between the inner cladding portion 250 and the outer cladding portion 260 at which the relative refractive index difference is $(\Delta n_6+\Delta n_c)/2$. Here, in the specification, the mean the relative refractive index differences of the respective glass regions 150, 160, and 250 are defined on the basis of the refractive index of the outer cladding portion 260, the means relative refractive index difference $\Delta n_c$ of the outer cladding portion 260 with respect to itself is 0.

The inventors have also confirmed that, when a region having a low refractive index (inner cladding portion 250) is disposed outside of the core region as in the case of the above-mentioned configuration, the dispersion slope can be reduced without any decrease in MFD. The effect on reducing the dispersion slope becomes greater as the indent C in the refractive index profile 800 is wider or deeper. Since this profile leads to increase in bending loss, however, there is a limit to the reducing of dispersion slope. As an SM optical fiber of a type in which relative refractive index difference of the glass region around the core is lowered, a fiber having a refractive index profile disclosed in Japanese Patent Laid-Open No. Sho 63-43107 has been suggested. In this publication, one of objects is to decrease glass additives, while attaining a higher relative refractive index difference at the core region (without changing the form of profile).

Nevertheless, Japanese Patent Laid-Open No. Sho 63-43107 does not mention the width and depth of the inner cladding. Though its specification states a width within the range of 1 to 35 $\mu$m or 1b to 10b (wherein b is inner core diameter; b=1 to 10 $\mu$m) and a depth within the relative refractive index difference range of $-0.1\%$ to $-0.6\%$, bending loss drastically increases in most part of these ranges.

By contrast, as in the case of the SM optical fiber 10, when the inner cladding portion 250 whose mean relative refractive index difference with respect to the outer cladding portion 260 is $\Delta n_6$ ($<0$) is formed inside of the outer cladding portion 260, seepage of signal light from the inner cladding portion 250 to the outer cladding portion 260 becomes greater on the long wavelength side in particular. Accordingly, the gradient (absolute value) of structure dispersion with respect to wavelength becomes smaller, thereby reducing the gradient (dispersion slope) of the total dispersion which includes the material dispersion in addition to the structure dispersion.

Here, in the case where f/e>4, even when the relative refractive index difference $\Delta n_6$ ($<0$) of the inner cladding portion 250 is made smaller so as to constantly hold the value of $e \cdot |\Delta n_6|/(f-e)$, the effect on reducing the dispersion slope can hardly be obtained. Accordingly, it is preferable that f/e$\leq$4.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

BRIEF DESCRIPTION OF THE DRAWINGS

FIGS. 11A–11G are processes for explaining a fourth method of fabricating the single-mode optical fiber according to the present invention;

FIG. 12 is a view showing a drawing step for an optical fiber preform obtained by the fourth fabricating method shown in FIGS. 11A–11G;

DESCRIPTION OF THE PREFERRED EMBODIMENTS

Figure 1:
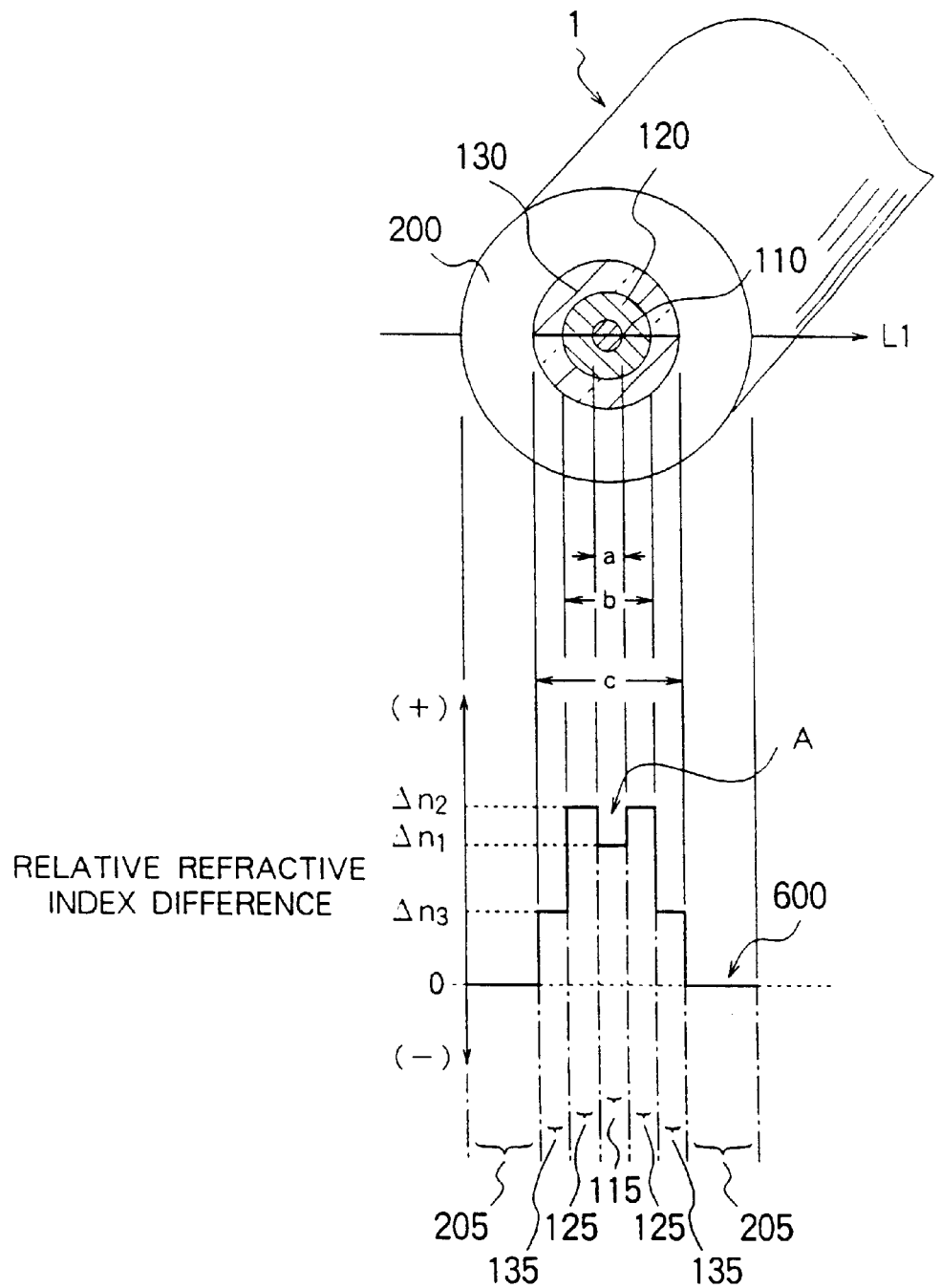
FIG. 1 is a view showing a configuration of a first embodiment of the single-mode optical fiber according to the present invention and a refractive index profile thereof.

In the following, the single-mode optical fiber (SM optical fiber) according to the present invention will be explained with reference to FIGS. 1 to 24. Here, parts identical to each other in the drawings will be referred to with marks identical to each other without their overlapping explanations repeated.

FIG. 1 is a view showing a cross-sectional configuration of the first embodiment of the SM optical fiber according to the present invention and a refractive index profile 600 thereof. An SM optical fiber 1 according to the present invention is an optical fiber mainly composed of silica glass comprising a core region having a predetermined refractive index and a cladding portion 200 which is formed around the outer periphery of the core region and whose refractive index is set lower than that of the core region. The core region comprises a first core portion 110 having a mean relative refractive index difference with respect to the cladding portion 200 of a first value $\Delta n_1$ and an outer diameter of a; a second core portion 120 formed around the outer periphery of the first core portion 110, the second core portion having a mean relative refractive index difference with respect to the cladding portion 200 of a second value $\Delta n_2$ ($>\Delta n_1$) and an outer diameter of b; and a third core portion 130 formed around the outer periphery of the second core portion 120, the third core portion having a mean relative refractive index difference with respect to the cladding portion 200 of a third value $\Delta n_3$ ($<\Delta n_2$) and an outer diameter of c.

The abscissa of the refractive index profile 600 shown in FIG. 1 corresponds to positions on line L1 in a cross section (plane perpendicular to the advancing direction of propagating signal light) of the SM optical fiber 1. Further, in this refractive index profile 600, regions 115, 125, 135, and 205 correspond to relative refractive index differences at positions on the line L1 in the first core portion 110, second core portion 120, third core portion 130, and cladding portion 200, respectively.

Further, in this specification, relative refractive index difference $\Delta$ is defined as:

$$\Delta = (n_t^2 - n_c^2)/2n_c^2$$

wherein $n_c$ is mean refractive index of the cladding 200 which is the reference, and $n_t$ is mean refractive index of each of the glass regions 110, 120, and 130. Accordingly, for example, the mean $\Delta n_1$ of the relative refractive index difference of the first core portion 110 having a mean refractive index $n_1$ with respect to the cladding portion 200 having the mean refractive index $n_c$, for example, is given by $(n_1^2 - n_c^2)/2n_c^2$. Also, it is not necessary to follow the order in the above-mentioned expression. Therefore, the glass region whose mean refractive index difference with respect to the cladding portion 200 is a negative value corresponds to a glass region having a mean refractive index lower than the mean refractive index $n_c$ of the cladding portion 200. Further, "mean refractive index" refers to a surface mean which is obtained when the mean of refractive indices at respective positions in a predetermined glass region is taken on a cross section perpendicular to the advancing direction of signal light (direction perpendicular to the line L1) in the SM optical fiber. The mean relative refractive index difference is given by the above-mentioned expression based on the mean refractive index in each glass region.

As shown in FIG. 1, the SM optical fiber 1 has a refractive index profile 600 in which an indent A (depression) with a sufficient width is provided at the center part of the core region. This indent A is defined when the first core portion 110 and the second core portion 120 satisfy the following relationship:

$$a \cdot (\Delta n_2 - \Delta n_1)/(b \cdot \Delta n_2) \geq 0.04$$

therebetween.

Also, in the SM optical fiber 1, in order to attain a sufficient effect on reducing the dispersion slope, the third value $\Delta n_3$ and the second value $\Delta n_2$ are respectively set to at least 0.03% and at least 0.4%.

Further, in order to lower bending loss, the SM optical fiber 1 is designed so as to attain $0.1 \leq b/c \leq 0.4$. More preferably, it is designed to satisfy $0.1 \leq b/c \leq 0.3$.

Here, in order to attain a sufficient effect on reducing the dispersion slope, $a \cdot (\Delta n_2 - \Delta n_1)/(b \cdot \Delta n_2)$ is preferably 0.5 or less.

Figure 2A:
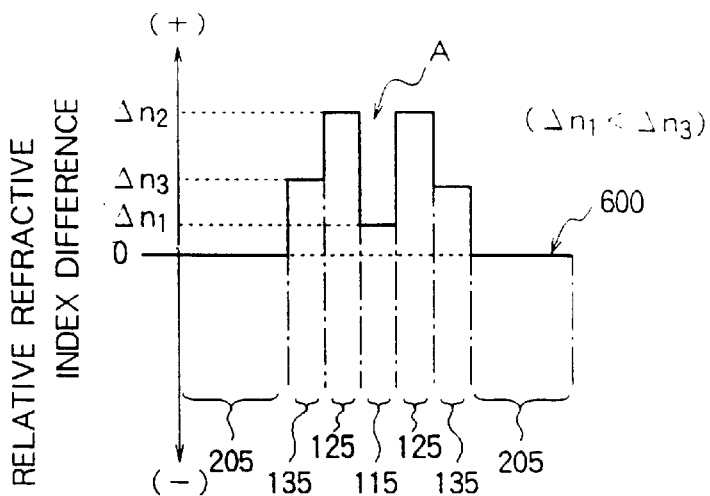
FIGS. 2A–2C are views showing various refractive index profiles of the single-mode optical fiber of FIG. 1 obtained by changing the first value $\Delta n_1$.
Figure 2B:
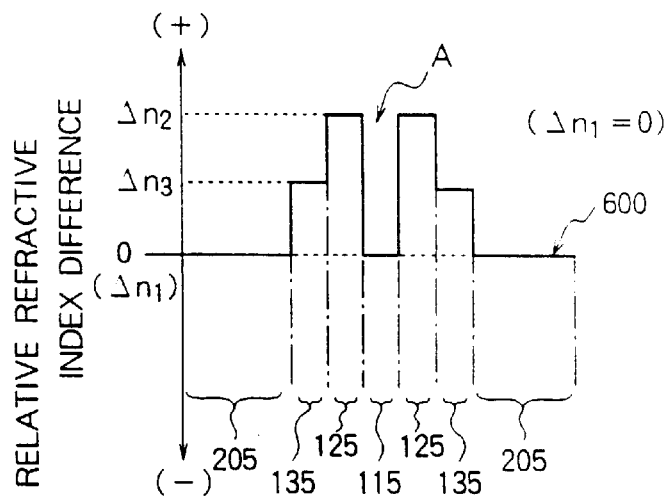
Figure 2C:
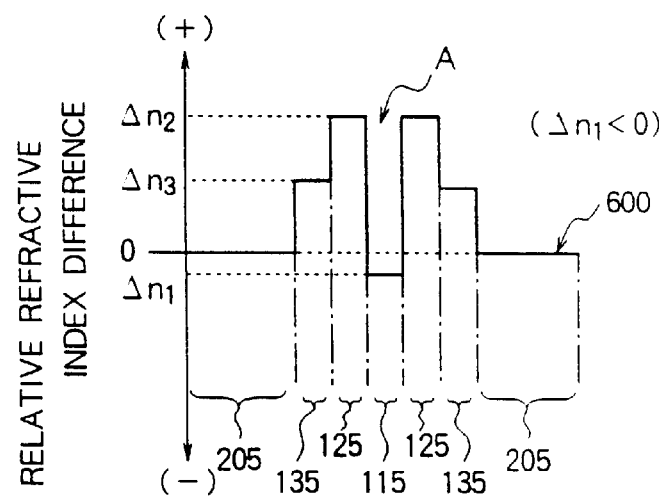

The refractive index profile 600 of the SM optical fiber 1 according to this invention can have a variety of profiles as shown in FIGS. 2A–2C by changing the first value $\Delta n_1$. Here, FIG. 2A shows the refractive index profile 600 where the first value $\Delta n_1$ is set lower than the third value $\Delta n_3$; FIG. 2B the refractive index profile 600 set such that the cladding portion 200 has the same refractive index ($\Delta n_1=0$) as that of the first core portion 110; FIG. 2C the refractive index profile 600 set such that the first value $\Delta n_1$ has a negative value (a state that the first core portion 110 has a lower refractive index than that of the cladding portion 200.)

Figure 3:
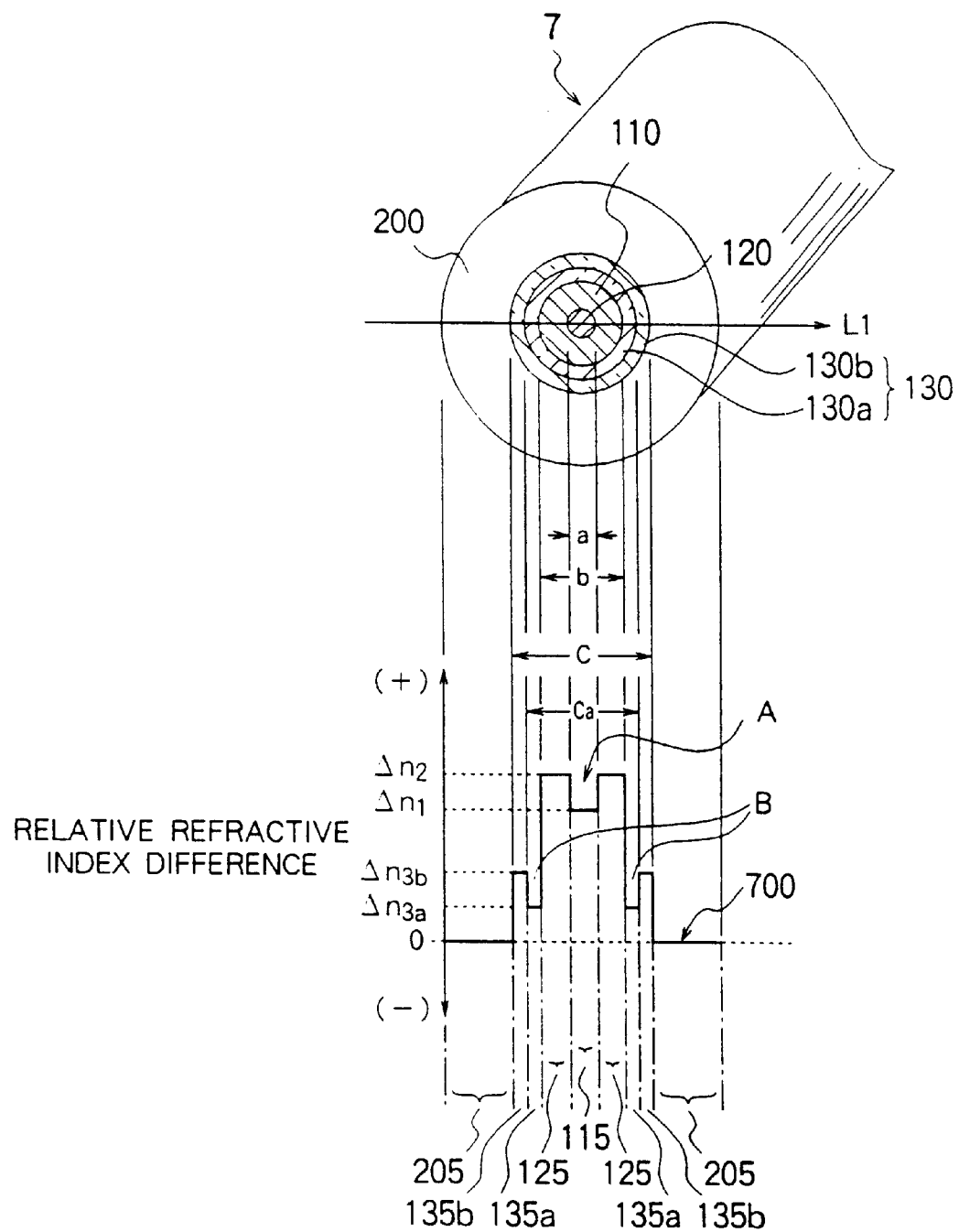
FIG. 3 is a view showing a configuration of an applied example of the first embodiment of the single-mode optical fiber according to the present invention and a refractive index profile thereof.

FIG. 3 is a view showing a cross-sectional configuration of an applied example of the first embodiment of the single-mode optical fiber shown in FIG. 1 and a refractive index profile 700 thereof. In this applied example, as shown in FIG. 3, the third core portion 130 is constituted by an inner core 130a formed around the outer periphery of the second core portion 120, the inner core 130a having a mean relative refractive index difference with respect to the cladding portion 200 of a fourth value $\Delta n_{3a}$ (<$\Delta n_2$) and an outer diameter of $c_a$ (<c), and an outer core 130b spaced from the second core portion 120 by way of the inner core 130a, the outer core 130b having a mean relative refractive index difference with respect to the cladding portion 200 of a fifth value $\Delta n_{3b}$ (<$\Delta n_2$ and >$\Delta n_{3a}$) and an outer diameter of c. In other words, in the refractive index profile 700 of FIG. 3, an indent B (depression) is formed at a region corresponding to the third core portion 130 (including the inner core 130a and the outer core 130b). Here, the inner core 130a and the outer core 130b satisfy the following relationship:

$$0.1 \leq (c_a-b) \cdot (\Delta n_{3b}-\Delta n_{3a})/(c \cdot \Delta n_{3b}) \leq 0.8$$

therebetween.

Since the indent B having sufficient width and depth is provided in the profile region corresponding to the third core portion 130, as in the case of the effect obtained by the above-mentioned indent A, seepage of light into the cladding portion 200 can be made greater, thereby decreasing the gradient of structure dispersion with respect to wavelength and consequently reducing the absolute value of dispersion slope.

Here, in FIG. 3, regions 135a and 135b correspond to relative refractive index differences at positions on the line L1 in the inner core 130a and the outer core 130b in the third core portion 130, respectively.

Figure 4A:
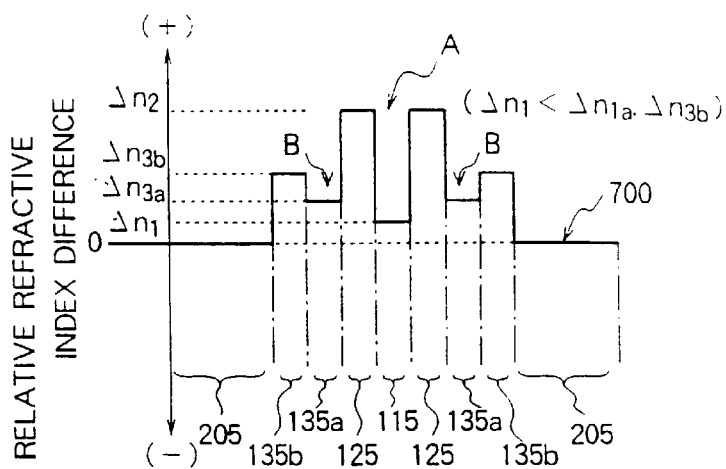
FIGS. 4A–4C are views showing various refractive index profiles of the single-mode optical fiber of FIG. 3 obtained by changing the first and fourth values $\Delta n_1$ and $\Delta n_{3a}$.
Figure 4B:
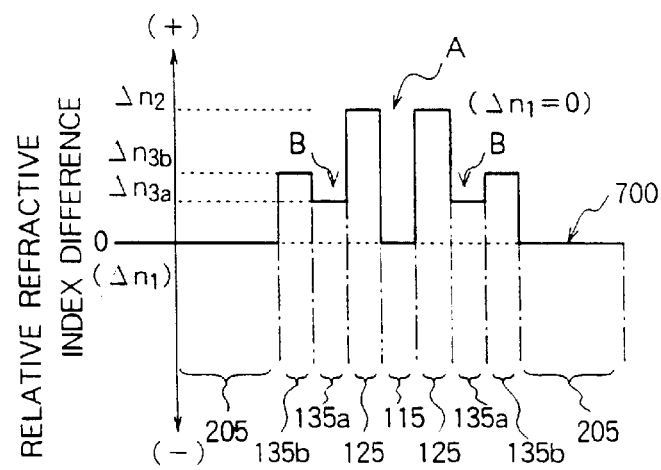
Figure 4C:
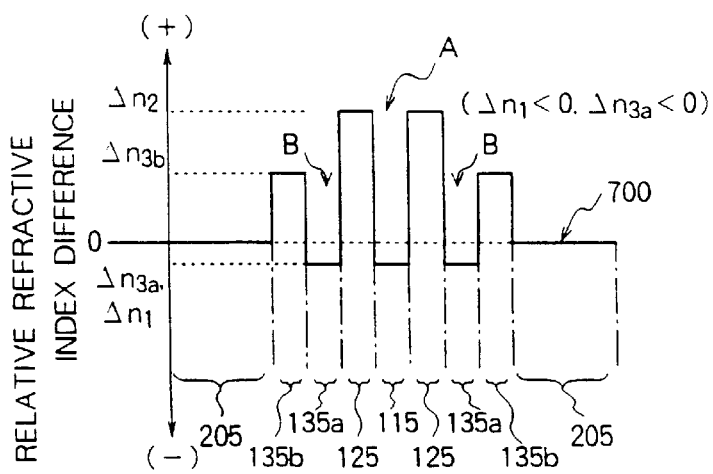

In addition, the refractive index profile 700 of the SM optical fiber 1 according to this invention can have a variety of profiles as shown in FIGS. 4A–4C by changing the first and fourth values $\Delta n_1$ and $\Delta n_{3a}$. Here, FIG. 4A shows the refractive index profile 700 where the first value $\Delta n_1$ is set lower than the fourth value $\Delta n_{3a}$; FIG. 4B the refractive index profile 700 set such that the cladding portion 200 has the same refractive index ($\Delta n_1$=0) as that of the first core portion 110; FIG. 4C the refractive index profile 700 set such that both the first and fourth values $\Delta n_1$ and $\Delta n_{3a}$ have a negative value (a state that the first core portion 110 and the inner core 130a having a lower refractive index than that of the cladding portion 200.) Note that the fourth value $\Delta n_{3a}$ may have zero in FIG. 4B (the inner core 130a having the same refractive index as that of the cladding portion 200), and also the first and fourth values $\Delta n_1$ and $\Delta n_{3a}$ can be independently set even in any refractive index profile 700.

The SM optical fiber of FIG. 1 is fabricated as explained in the following.

(First Fabricating Method)

FIGS. 5A–5D and 6 are processes for explaining a first method of fabricating the SM optical fiber 1 having a refractive index profile 600 as shown in FIG. 1. This first fabricating method belongs to the MCVD method. Note that, described below, the large-and-small relation between the relative index differences $\Delta n_1$, $\Delta n_2$, and $\Delta n_3$ of the respective glass regions to the cladding portion is changeable as shown in FIGS. 2A–2C.

Figure 5A:
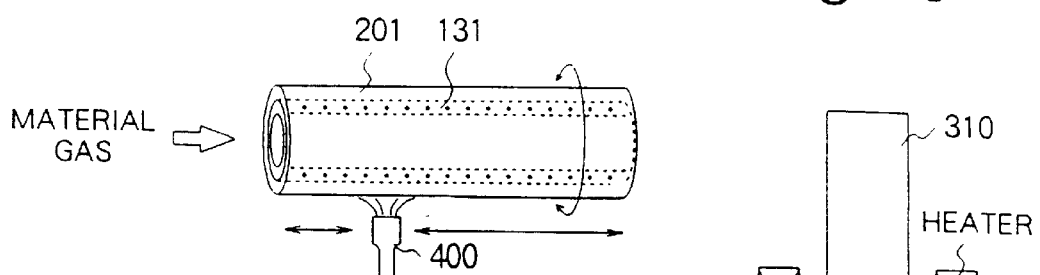
FIGS. 5A–5D are processes for explaining a first method of fabricating the single-mode optical fiber according to the present invention.

As shown in FIGS. 5A–5D, initially, a glass tube 201 which is mainly composed of silica glass and is to be the cladding portion 200 is heated with a burner 400, while flowing a material gas containing at least Si and Ge through a hollow part of the glass tube 201, thereby forming, on the inner surface of the glass tube 201, a first soot body 131 to be the third core portion 130 after vitrification, the third core portion 130 having a relative refractive index difference with respect to the cladding portion 200 of $\Delta n_3$ (see FIG. 5A).

Figure 5B:
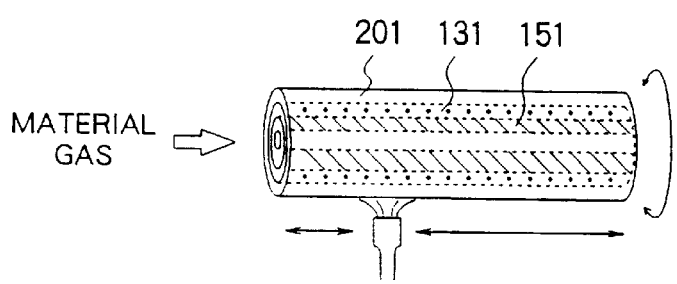
Figure 5C:
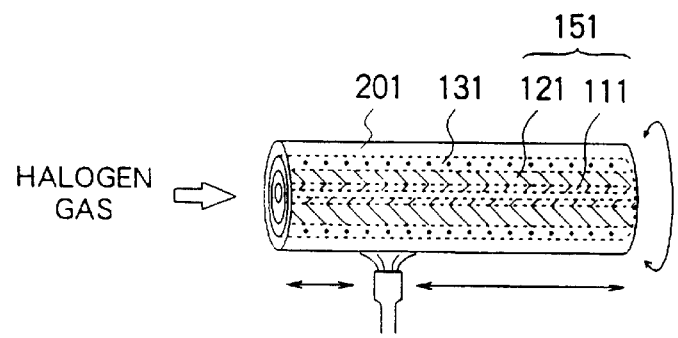

Subsequently, the glass tube 201 in which the first soot body 131 is formed is heated, while flowing a material gas containing at least Si and Ge through the hollow part of the glass tube 201, thereby forming, on the inner surface of the first soot body 131, a second soot body 151 to be a glass region having a mean relative refractive index difference with respect to the cladding portion 200 of $\Delta n_2$ (>$\Delta n_3$) after vitrification (see FIG. 5B).

Then, the glass tube 201 in which the first soot body 131 and the second soot body 151 are formed is heated, while flowing a halogen gas through the hollow part of the glass tube 201, so as to diffuse germanium on the inner surface side of the second soot body 151. Accordingly, from the second soot body 151, an outer soot body 121 to be the second core portion 120 after vitrification, the second core portion 120 having a mean relative refractive index difference with respect to the cladding portion 200 of $\Delta n_2$, and an inner soot body 111 to be the first core portion 110 after vitrification, the first core portion 110 having a mean relative refractive index difference with respect to the cladding portion 200 of $\Delta n_1$ (<$\Delta n_2$) are obtained (see FIG. 5C).

Figure 5D:
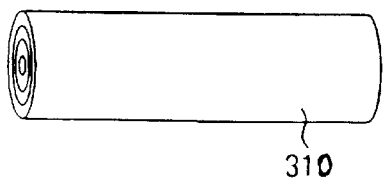

Thereafter, the glass tube 210 in which the first soot body 131, the outer soot body 121, and the inner soot body 111 are formed is heated and collapsed so as to obtain a transparent optical fiber preform 310 (see FIG. 5D).

Figure 6:
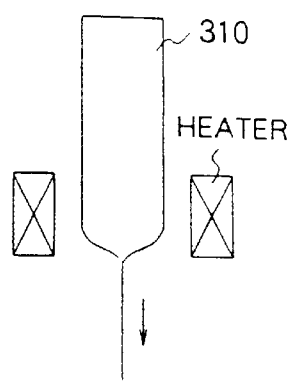
FIG. 6 is a view showing a drawing step for an optical fiber preform obtained by the first fabricating method shown in FIGS. 5A–5D.

As one end of thus obtained optical fiber preform 310 is drawn while being heated, the SM optical fiber 1 having the refractive index profile 600 as shown in FIGS. 1 and 2A–2C is yielded (see FIG. 6).

In the above-mentioned drawing step, the optical fiber preform 310 is drawn so as to yield the SM optical fiber 1 in which the first core portion 110 and the second core portion 120 satisfy the following relationship:

$$a \cdot (\Delta n_2-\Delta n_1)/(b \cdot \Delta n_2) \geq 0.04$$

therebetween.

Further, in order to obtain the SM optical fiber 1 having the refractive index profile 700 shown in FIG. 3, the glass tube 201 in which the first soot body 131 is formed is heated, while flowing a halogen gas (e.g. chlorine) through the hollow part of the glass tube 201, so as to diffuse germanium contained in the inner surface side of the first soot body 131, thereby reducing the germanium concentration of the inner surface side of the first soot body 131 as compared with that of the glass tube side of the first soot body 131. Accordingly, from the first soot body 131, an inner soot body to be the inner core 130a of the third core portion 130 after vitrification, the inner core 130a having a mean relative refractive index difference with respect to the cladding portion 200 of the fourth value $\Delta n_{3a}$ (<$\Delta n_2$) and being formed around the outer periphery of the second core portion 120, and an outer soot body to be the outer core 130b of the third core portion 130 after vitrification, the outer core 130b having a mean relative refractive index difference with respect to the cladding portion 200 of the fifth value $\Delta n_{3b}$ (<$\Delta n_2$ and >$\Delta n_{3a}$) and being formed around the outer periphery of the inner core 130a are obtained. Here, in the above-mentioned drawing step, the optical fiber preform 310 is drawn so as to obtain the SM optical fiber 1 in which the outer diameter of the inner core 130a of the third core portion 130 is $c_a$ (<c), the outer diameter of the outer core 130b of the third core portion 130 is c, and the inner core 130a and the outer core 130b satisfy the following relationship:

$$0.1 \leq (c_a-b) \cdot (\Delta n_{3b}-\Delta n_{3b})/(c \cdot \Delta n_{3b}) \leq 0.8$$

therebetween.

Also the first and fourth values $\Delta n_1$ and $\Delta n_{3a}$ can be independently set even in any refractive index profile 700 as shown in FIGS. 4A–4C.

(Second Fabricating Method)

FIGS. 7A–7E and 8 are processes for explaining a second method of fabricating the SM optical fiber 1 having the refractive index profile 600 as shown in FIGS. 1 and 2A–2C. This second fabricating method belongs to the VAD method. Note that, described below, the large-and-small relation between the relative index differences $\Delta n_1$, $\Delta n_2$, and $\Delta n_3$ of the respective glass regions to the cladding portion is changeable as shown in FIGS. 2A–2C.

Figure 7A:
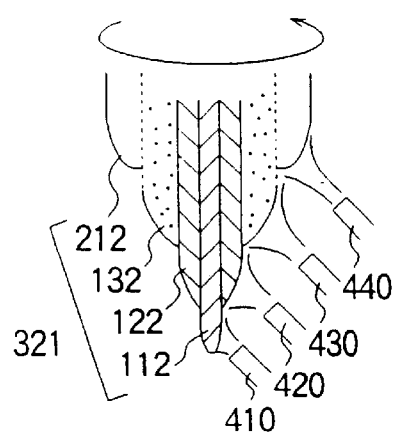
FIGS. 7A–7E are processes for explaining a second method of fabricating the single-mode optical fiber according to the present invention.

As shown in FIGS. 7A–7E, initially, burners 410, 420, 430, and 440 are respectively used to form a first soot body 112 to be the first core portion 110 after vitrification, the first core portion 110 having a mean relative refractive index difference with respect to the cladding portion 200 of $\Delta n_1$; a second soot body 122 to be the second core portion 120 after vitrification and formed around the outer periphery of first soot body 112, the second core portion 120 having a mean relative refractive index difference with respect to the cladding portion 200 of $\Delta n_2$ ($>\Delta n_1$); a third soot body 132 to be the third core portion 130 after vitrification and formed around the outer periphery of second soot body 122, the third core portion having a mean relative refractive index difference with respect to the cladding portion 200 of $\Delta n_3$ ($<\Delta n_2$), and a fourth soot body 212 to be the inner part of the cladding portion 200 having a predetermined refractive index after vitrification and formed around the outer periphery of third soot body 132; thereby obtaining a composite soot body 321 (see FIG. 7A).

Figure 7B:
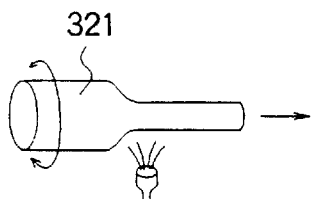
Figure 7C:
Figure 7D:
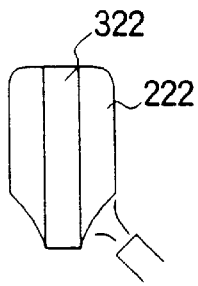
Figure 7E:
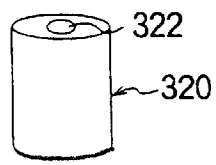

Then, thus obtained composite soot body 321 is heated and stretched to yield a transparent composite glass body 322 (see FIGS. 7B and 7C).

Subsequently, a burner 450 is used to form, around the outer periphery of the composite glass body 322, a fifth soot body 222 to be an outer part of the cladding portion 200 after vitrification. Then, it is stretched to obtain a transparent optical fiber preform 320 (see FIGS. 7D and 7E).

Figure 8:
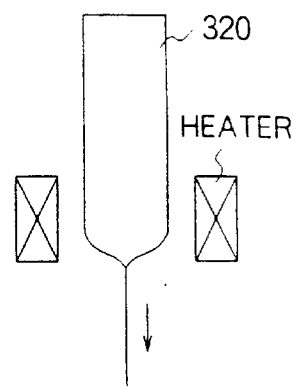
FIG. 8 is a view showing a drawing step for an optical fiber preform obtained by the second fabricating method shown in FIGS. 7A–7E.

As one end of thus obtained optical fiber preform 320 is drawn while being heated, the SM optical fiber 1 having the refractive index profile 600 as shown in FIGS. 1 and 2A–2C is yielded (see FIG. 8).

In the above-mentioned drawing step, the optical fiber preform 320 is drawn so as to yield the SM optical fiber 1 in which the first core portion 110 and the second core portion 120 satisfy the following relationship:

$$a \cdot (\Delta n_2 - \Delta n_1)/(b \cdot \Delta n_2) \geq 0.04$$

therebetween.

Further, in order to obtain the SM optical fiber 1 having the refractive index profile 700 as shown in FIGS. 3 and 4A–4C, an inner soot body to be the inner core 130a of the third core portion 130 after vitrification, the inner core 130a having a mean relative refractive index difference with respect to the cladding portion 200 of the fourth value $\Delta n_{3a}$ ($<\Delta n_2$) and formed around the outer periphery of the second core portion 120, and an outer soot body to be the outer core 130b of the third core portion 130 after vitrification, the outer core 130b having a mean relative refractive index difference with respect to the cladding portion 200 of the fifth value $\Delta n_{3b}$ ($<\Delta n_2$ and $>\Delta n_{3a}$) and formed around the outer periphery of the inner core 130a are successively formed, as the third soot body 132, around the outer periphery of the second soot body 122. Here, in the above-mentioned drawing step, the optical fiber preform 320 is drawn so as to obtain the SM optical fiber 1 in which the outer diameter of the inner core 130a of the third core portion 130 is $c_a$ ($<c$), the outer diameter of the outer core 130b of the third core portion 130 is c, and the inner core 130a and the outer core 130b satisfy the following relationship:

$$0.1 \leq (c_a - b) \cdot (\Delta n_{3b} - \Delta n_{3a})/(c \cdot \Delta n_{3b}) \leq 0.8$$

therebetween.

Also the first and fourth values $\Delta n_1$ and $\Delta n_{3a}$ can be independently set even in any refractive index profile 700 as shown in FIGS. 4A–4C.

(Third Fabricating Method)

FIGS. 9A–9G and 10 are processes for explaining a third method of fabricating the SM optical fiber 1 having the refractive index profile 600 as shown in FIGS. 1 and 2A–2C. This third fabricating method belongs to the OVD method. Note that, described below, the large-and-small relation between the relative index differences $\Delta n_1$, $\Delta n_2$, and $\Delta n_3$ of the respective glass regions to the. cladding portion is changeable as shown in FIGS. 2A–2C.

Figure 9A:
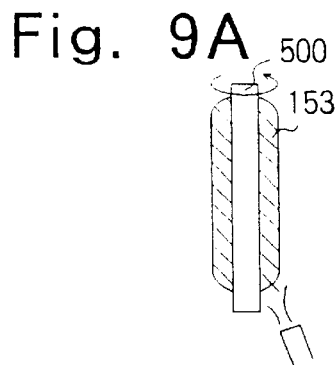
FIGS. 9A–9G are processes for explaining a third method of fabricating the single-mode optical fiber according to the present invention.
Figure 9B:
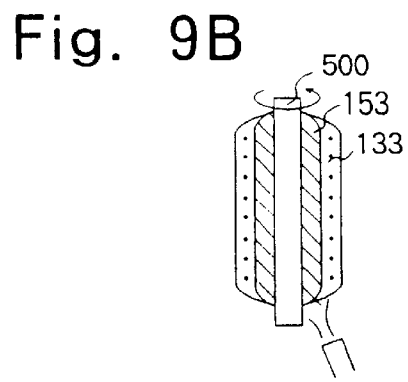
Figure 9C:
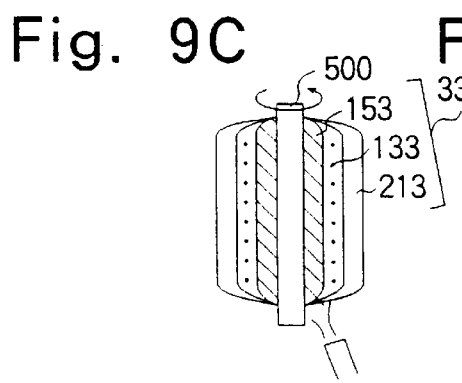
Figure 9D:
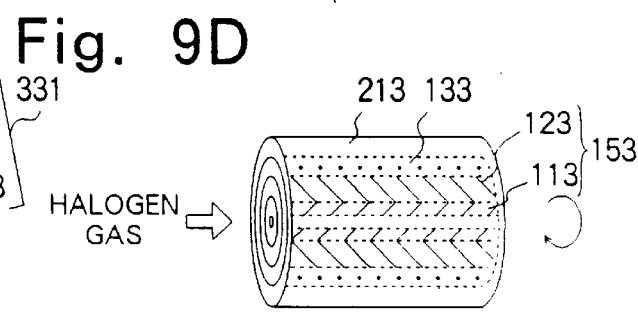
Figure 9G:
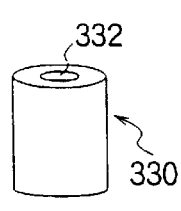
Figure 9F:
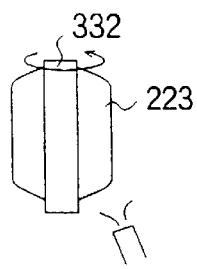
Figure 9E:
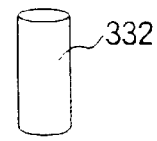

As shown in FIGS. 9A–9G, initially, around a cylindrical glass rod 500, a first soot body 153 to be a glass region having a mean relative refractive index difference with respect to the cladding portion 200 of $\Delta n_2$ after vitrification is formed (see FIG. 9A). Subsequently, around the outer periphery of the first soot body 153, a second soot body 133 to be the third core portion 130 after vitrification, the third core portion having a mean relative refractive index difference with respect to the cladding portion 200 of $\Delta n_3$ ($<\Delta n_2$) is formed (see FIG. 9B). Further, around the outer periphery of the second soot body 133, a third soot body 213 to be an inner part of the cladding portion 200 after vitrification is formed (see FIG. 9C).

Then, the glass rod 500 is pulled out, and a tubular soot body 331 composed of the first soot body 152, second soot body 133, and third soot body 213 is heated, while flowing a halogen gas through a hollow part of the tubular soot body 331, so as to diffuse germanium on the inner surface side of the first soot body 152. Accordingly, from the first soot body 152, an outer soot body 123 to be the second core portion 120 after vitrification, the second core portion 120 having a mean relative refractive index difference with respect to the cladding portion 200 of $\Delta n_2$ ($>\Delta n_3$), and an inner soot body 113 to be the first core portion 110 after vitrification, the first core portion 110 having a mean relative refractive index difference with respect to the cladding portion 200 of $\Delta n_1$ ($<\Delta n_2$) are obtained (see FIG. 9D).

Thereafter, the tubular soot body 331 is heated and collapsed. Further, it is stretched to obtain a transparent composite glass body 332 (see FIG. 9E).

Subsequently, the burner 450 is used to form, around the outer periphery of the composite glass body 332, a fourth soot body 223 to be an outer part of the cladding portion 200 having a predetermined refractive index after vitrification. Then, it is stretched to obtain a transparent optical fiber preform 330 (see FIGS. 9F and 9G).

Figure 10:
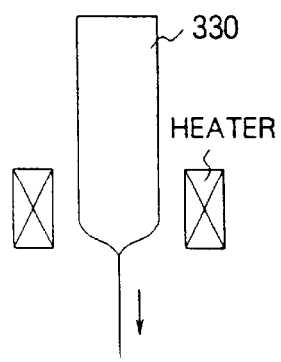
FIG. 10 is a view showing a drawing step for an optical fiber preform obtained by the third fabricating method shown in FIGS. 9A–9G.

As one end of thus obtained optical fiber preform 330 is drawn while being heated, the SM optical fiber 1 having the refractive index profile 600 as shown in FIGS. 1 and 2A–2C is yielded (see FIG. 10).

In the above-mentioned drawing step, the optical fiber preform 330 is drawn so as to yield the SM optical fiber 1 in which the first core portion 110 and the second core portion 120 satisfy the following relationship:

$$a \cdot (\Delta n_2 - \Delta n_1)/(b \cdot \Delta n_2) \geq 0.04$$

therebetween.

As explained in the foregoing, in the third fabricating method, for 100 minutes at a temperature of 1,000° C., chlorine gas is flowed through the hollow part of the soot body manufactured by the OVD method; and then the composite body is collapsed and stretched to make the transparent optical fiber preform. In the SM optical fiber fabricated from the optical fiber preform obtained by way of this step, the value of $a \cdot (\Delta n_2 - \Delta n_1)/(b \cdot \Delta n_2)$ is 0.1, whereas that in the SM optical fiber fabricated from the optical fiber preform without this step is 0.02. Accordingly, in this method, the size of the indent A (well) can be made five times as large as that conventionally obtained. Here, in the SM optical fiber fabricated from the optical fiber preform obtained according to the method of the present invention, $\Delta n_1 = 0.4\%$, $\Delta n_2 = 0.9\%$, $\Delta n_1 = 0.08\%$, and $b/c = 0.26$.

Further, in order to obtain the SM optical fiber 1 having the refractive index profile 700 as shown in FIGS. 3 and 4A–4C, an inner soot body to be the inner core 130a of the third core portion 130 after vitrification, the inner core 130a having a mean relative refractive index difference with respect to the cladding portion 200 of the fourth value $\Delta n_{3a}$ ($<\Delta n_2$) and being formed around the outer periphery of the second core portion 120, and an outer soot body to be the outer core 130b of the third core portion 130 after vitrification, the outer core 130b having a mean relative refractive index difference with respect to the cladding portion 200 of the fifth value $\Delta n_{3b}$ ($<\Delta n_2$ and $>\Delta n_3$,) and being formed around the outer periphery of the inner core 130a are successively formed, as the second soot body 133, around the outer periphery of the first soot body 153. Here, in the above-mentioned drawing step, the optical fiber preform 330 is drawn so as to obtain the SM optical fiber 1 in which the outer diameter of the inner core 130a of the third core portion 130 is $c_a$ ($<c$), the outer diameter of the outer core 130b of the third core portion 130 is c, and the inner core 130a and the outer core 130b satisfy the following relationship:

$$0.1 \leq (c_a - b) \cdot (\Delta n_{3b} - \Delta n_{3a})/(c \cdot \Delta n_{3b}) \leq 0.8$$

therebetween.

Also the first and fourth values $\Delta n_1$ and $\Delta n_{3a}$ can be independently set even in any refractive index profile 700 as shown in FIGS. 4A–4C.

(Fourth Manufacturing Method)

FIGS. 11A–11G and 12 are process charts for explaining a fourth method of making the SM optical fiber 1 in accordance with the present invention. This fourth manufacturing method belongs to the OVD method. Note that, described below, the large-and-small relation between the relative index differences $\Delta n_1$, $\Delta n_2$, and $\Delta n_3$ of the respective glass regions to the cladding portion is changeable as shown in FIGS. 2A–2C.

As shown in FIGS. 11A–11G, initially, around the cylindrical glass rod 500, a first soot body 124 to be the second core portion 120 after vitrification, the second core portion 120 having a mean relative refractive index difference with respect to the cladding portion 200 of $\Delta n_2$ is formed (see FIG. 11A). Subsequently, around the outer periphery of the first soot body 124, a second soot body 134 to be the third core portion 130 after vitrification, the third core portion 130 having a mean relative refractive index difference with respect to the cladding portion 200 of $\Delta n_3$ ($<\Delta n_2$) is formed (see FIG. 11B). Further, around the outer periphery of the second soot body 134, a third soot body 214 to be an inner part of the cladding portion 200 having a predetermined refractive index after vitrification is formed (see FIG. 11C).

Thereafter, the glass rod 500 is pulled out; the first soot body 124, the second soot body 134, and the third soot body 214 are heated and sintered; and then a cylindrical glass rod 114 to be the first core portion 110 after vitrification, the first core portion 110 having a mean relative refractive index difference with respect to the cladding portion 200 of $\Delta n_1$ ($<\Delta n_2$) is inserted into a hollow part of thus sintered body 341 and heated so that they are integrated together. Further, thus integrated body is stretched to obtain a transparent glass body 342 (see FIGS. 11D and 11E).

Subsequently, the burner 450 is used to form, around the outer periphery of the composite glass body 342, a fourth soot body 224 to be an outer part of the cladding portion 200 having a predetermined refractive index after vitrification. Then, it is stretched to obtain a transparent optical fiber preform 340 (see FIGS. 11F and 11G).

As one end of thus obtained optical fiber preform 340 is drawn while being heated, the SM optical fiber 1 having the refractive index profile 600 as shown in FIGS. 1 and 2A–2C is yielded (see FIG. 12).

In the above-mentioned drawing step, the optical fiber preform 340 is drawn so as to yield the SM optical fiber 1 in which the first core portion 110 and the second core portion 120 satisfy the following relationship:

$$a \cdot (\Delta n_2 - \Delta n_1)/(b \cdot \Delta n_2) \geq 0.04$$

therebetween.

As explained in the foregoing, in the fourth fabricating method, a cylinder having a relative refractive index difference of 0.3% is inserted into the hollow part of the soot body formed by the OVD method, and they are integrated together, while being heated, to make the optical fiber preform. In the SM optical fiber fabricated from this optical fiber preform, the value of $a \cdot (\Delta n_2 - \Delta n_1)/(b \cdot \Delta n_2)$ is 0.5, which is 25 times as large as 0.02 which is obtained without insertion of the cylinder.

Further, in order to obtain the SM optical fiber 1 having the refractive index profile 700 shown in FIGS. 3 and 4A–4C, an inner soot body to be the inner core 130a of the third core portion 130 after vitrification, the inner core 130a having a mean relative refractive index difference with respect to the cladding portion 200 of the fourth value $\Delta n_3$, ($<\Delta n_2$) and formed around the outer periphery of the second core portion 120, and an outer soot body to be the outer core 130b of the third core portion 130 after vitrification, the outer core 130b having a mean relative refractive index difference with respect to the cladding portion 200 of the fifth value $\Delta n_{3b}$ ($<\Delta n_2$ and $>\Delta n_{3a}$) and formed around the outer periphery of the inner core 130a are successively formed, as the second soot body 134, around the outer periphery of the first soot body 124. Here, in the above-mentioned drawing step, the optical fiber preform 340 is drawn so as to obtain the SM optical fiber 1 in which the outer diameter of the inner core 130a of the third core portion 130 is $c_a$ ($<c$), the outer diameter of the outer core 130b of the third core portion 130 is c, and the inner core 130a and the outer core 130b satisfy the following relationship:

$$0.1 \leq (c_a - b) \cdot (\Delta n_{3b} - \Delta n_{3a})/(c \cdot \Delta n_{3b}) \leq 0.8$$

therebetween.

Also the first and fourth values $\Delta n_1$ and $\Delta n_{3a}$ can be independently set even in any refractive index profile 700 as shown in FIGS. 4A–4C.

In the wavelength region used for transmission in an SM optical fiber, two phenomenons, namely, a material dispersion in which velocity of propagation toward the longitudinal direction (direction in which signal light advances) becomes faster as the signal light has a longer wavelength and a structure dispersion in which velocity of propagation becomes faster as the signal light has a shorter wavelength, occur concurrently. Since the SM optical fiber normally has a refractive index profile in which the refractive index near the center of the core has a constant value or decreases toward the outside, in this case, gradients of the material dispersion and the structure dispersion with respect to wavelength have polarities opposite to each other, while the material dispersion normally has a larger absolute value of gradient. Accordingly, the total dispersion obtained as the material dispersion and structure dispersion are added together has an intrinsic gradient (gradient of a dispersion curve at the zero dispersion slope being referred to as "dispersion slope" in particular) with respect to wavelength.

By contrast, the SM optical fiber 1 in accordance with the present invention is constituted by the first core portion 110 whose mean relative refractive index difference with respect to the cladding portion 200 is $\Delta n_1$ and whose diameter is a; the second core portion 120 whose mean relative refractive index difference with respect to the cladding portion 200 is $\Delta n_2$ ($>\Delta n_1$) and whose outer diameter is b, formed around the outer periphery of the first core portion 110; the third core portion 130 whose mean relative refractive index difference with respect to the cladding portion 200 is $\Delta n_3$ ($<\Delta n_2$) and whose outer diameter is c; and the cladding portion 200 having a predetermined refractive index formed around the outer periphery of the third core portion 130. Accordingly, the absolute value of gradient of structure dispersion with respect to wavelength is made smaller such that the dispersion slope (absolute value of gradient at the zero dispersion wavelength) can be decreased. More preferably, as shown in FIG. 3, the third core portion 130 may be constituted by the inner core 130a and the outer core 130b so as to attain a refractive index profile in which an indent is provided.

Figure 13:
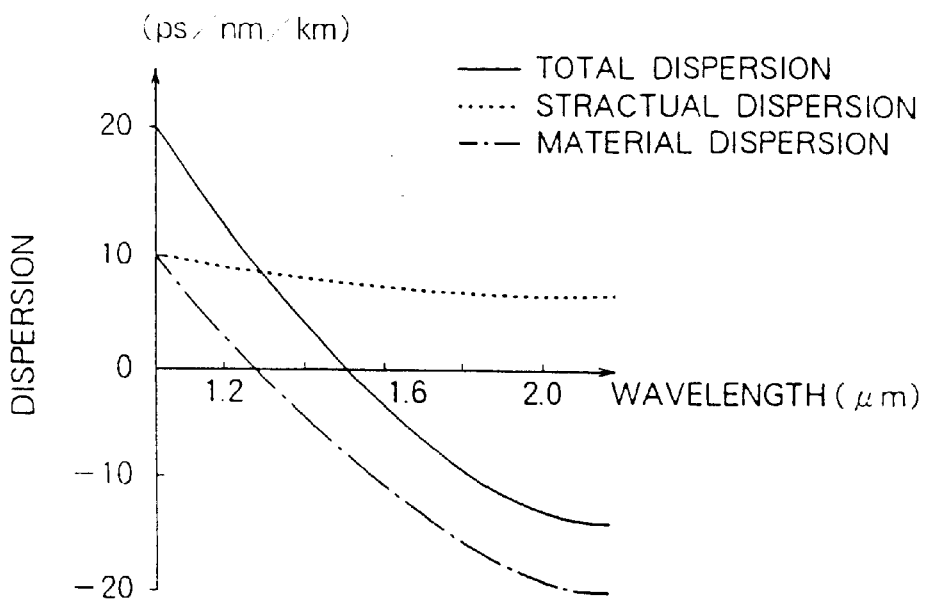
FIG. 13 is a graph for explaining a relationship between wavelength and dispersion in the single-mode optical fiber shown in FIG. 1.
Figure 14:
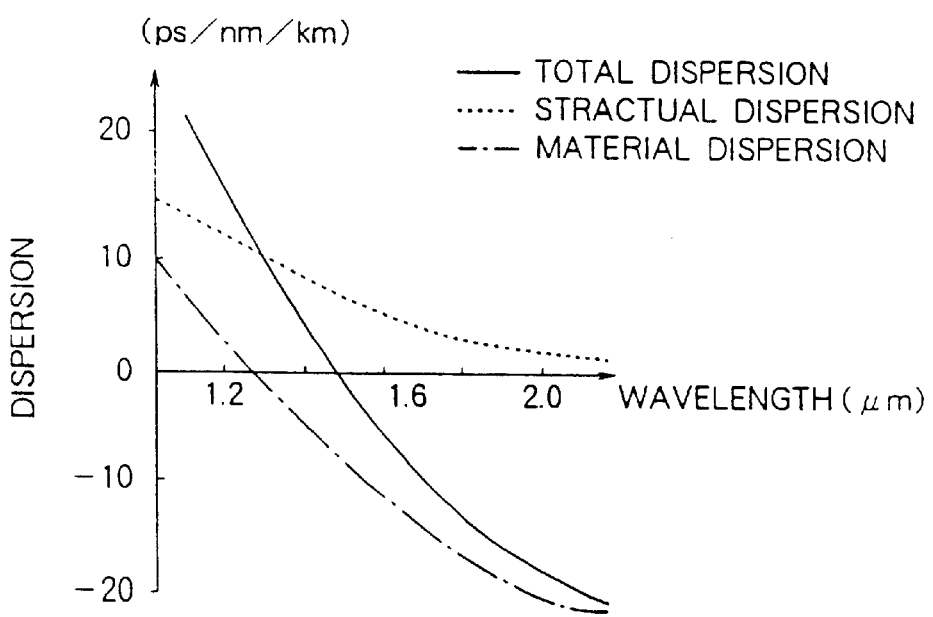
FIG. 14 is a graph for explaining a relationship between wavelength and dispersion in the conventional single-mode optical fiber.

FIG. 13 is a graph for explaining a relationship between wavelength and dispersion in the SM optical fiber 1 of FIG. 1. Also, FIG. 14 is a graph showing a relationship between wavelength and dispersion in the conventional SM optical fiber ($\Delta n_1=\Delta n_2$). It can be confirmed from FIGS. 13 and 14 that the effect on lowering the dispersion slope is greater as the ratio (a/b) of the outer diameter a of the first core portion 110 to the outer diameter b of the second core portion 120 is larger or the difference ($\Delta n_2 - \Delta n_1$) between the relative refractive index difference $\Delta n_2$ of the second core portion 120 with respect to the cladding portion 200 and the relative refractive index difference $\Delta n_1$ of the first core portion 110 with respect to the cladding portion 200 is larger. It is due to the fact that the wavelength dependency of light seeping into the third core portion 130 or cladding portion 200 becomes greater, thereby reducing the gradient (absolute value) of structure dispersion with respect to wavelength.

In the SM optical fiber 1 in accordance with the present invention in which the relative refractive index difference $\Delta n_1$ of the first core portion 110 positioned at the center of the core region is set lower than the relative refractive index difference $\Delta n_2$ of the surrounding second core portion 120, the bending loss characteristic does not deteriorate so much as. that in the conventional SM optical fiber. It is due to the fact, when MFD values of these portions are set to the same value, their cut-off wavelengths substantially equal to each other, while the bending loss characteristic is determined by the value of (MFD)/(cut-off wavelength). In an SM optical fiber having a step-form refractive index profile mainly used as a transmission line for light of 1.3-$\mu$m wavelength band, however, since seepage of light into the cladding portion is small, the reducing of dispersion slope cannot be expected even when the relative refractive index difference at the center part of the core is made small.

Figure 15:
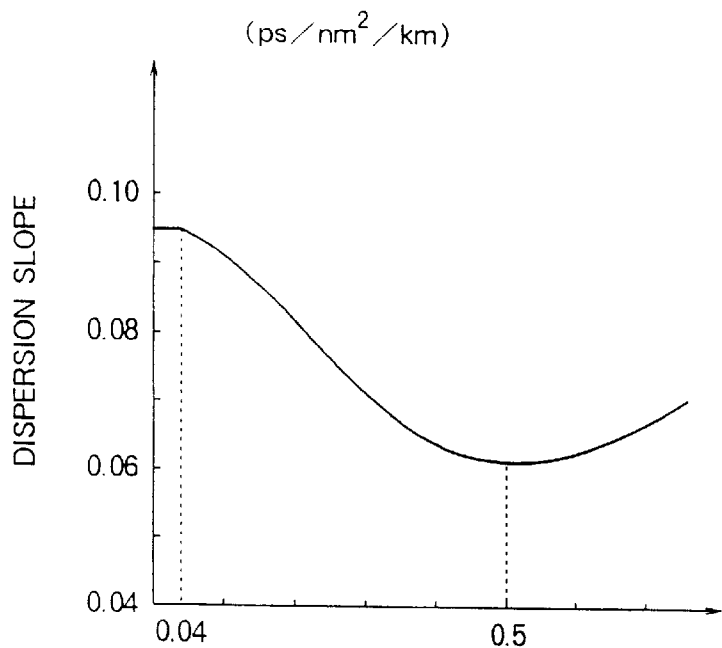
FIG. 15 is a graph showing a relationship between $a \cdot (\Delta n_2 - \Delta n_1)/(b \cdot \Delta n_2)$ and dispersion slope in the single-mode optical fiber shown in FIG. 1.

Further, FIG. 15 is a graph showing a relationship between $a \cdot (\Delta n_2 - \Delta n_1)/(b \cdot \Delta n_2)$ and dispersion slope. In FIG. 15, while $\Delta n_2=1.0\%$, $\Delta n_3=0.12\%$, and b/c=0.25, the outer diameter c of the third core portion 130 is changed such that MFD becomes 8.0 $\mu$m or greater (wherein the ratio of a, b, and c is unchanged). It can be seen from FIG. 15 that the effect on lowering the dispersion slope is obtained when $$a \cdot (\Delta n_2 - \Delta n_1)/(b \cdot \Delta n_2) \geq 0.04$$

and this effect is maximized when $$a \cdot (\Delta n_2 - \Delta n_1)/(b \cdot \Delta n_2) = 0.5.$$

Figure 16:
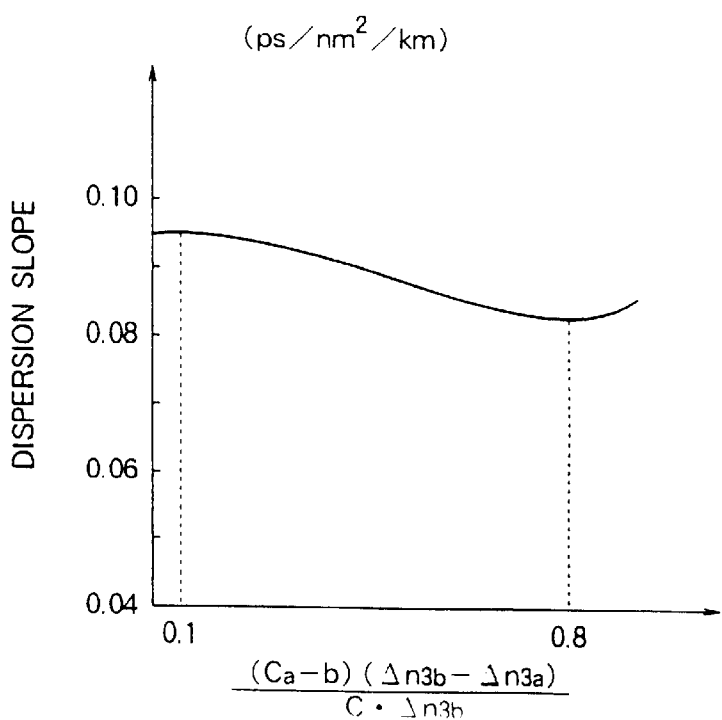
FIG. 16 is a graph showing a relationship between $(c_a - b) \cdot (\Delta n_{3b} - \Delta n_{3a})/(c \cdot \Delta n_{3b})$ and dispersion slope in the single-mode optical fiber shown in FIG. 3.

Similarly, FIG. 16 is a graph showing a relationship between $(c_a - b) \cdot (\Delta n_{3b} - \Delta n_{3a})/(c \cdot \Delta n_{3b})$ and dispersion slope in the SM optical fiber 1 of FIG. 3. In FIG. 16, while $a \cdot (\Delta n_2 - \Delta n_1)/(b \cdot \Delta n_2)$ is set to 0.1, $c \cdot \Delta n_{3b}$ is changed so as to alter the size of the indent B. It can be seen from FIG. 16 that the effect on reducing the dispersion slope is obtained when $$0.1 \leq (c_a - b) \cdot (\Delta n_{3b} - \Delta n_{3a})/(c \cdot \Delta n_{3b})$$

and this effect is maximized when $$(c_a - b) \cdot (\Delta n_{3b} - \Delta n_{3a})/(c \cdot \Delta n_{3b}) = 0.8.$$

Accordingly, when the indent B satisfying the relationship of $0.1 \leq (c_a - b) \cdot (\Delta n_{3b} - \Delta n_{3a})/(c \cdot \Delta n_{3b}) \leq 0.8$ is provided in the profile region corresponding to the third core portion 130 (including the inner core 130a and the outer core 130b) in the SM optical fiber 1 of FIG. 3, the dispersion slope can be further lowered as compared with that in the SM optical fiber having a refractive index profile without the indent.

Figure 17:
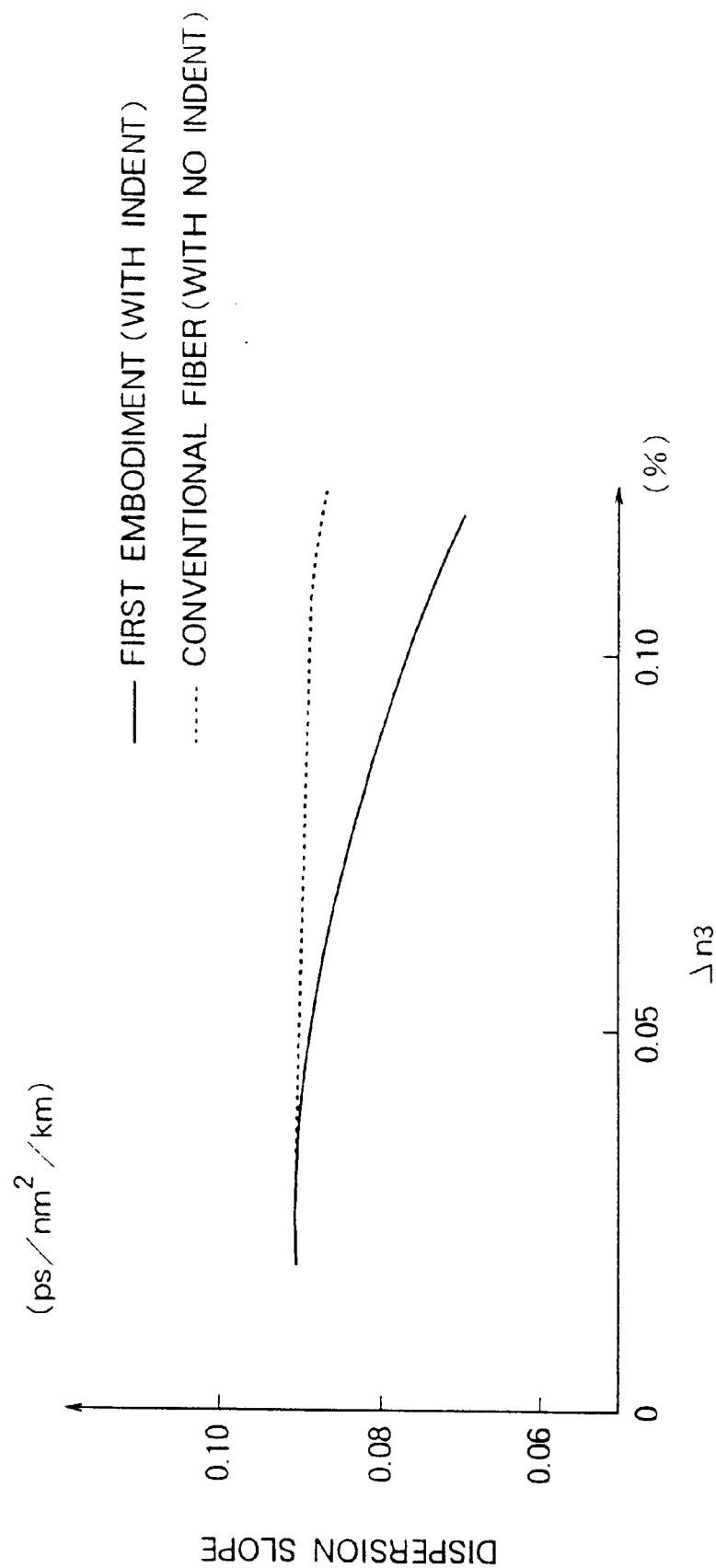
FIG. 17 is a graph showing a relationship between dispersion slope and $\Delta n_3$ in the single-mode optical-fiber shown in FIG. 1.

FIG. 17 is a graph showing a relationship between dispersion slope and $\Delta n_3$ (corresponding to $\Delta n_{3b}$ in the SM optical fiber 1 of FIG. 3) in the SM optical fiber 1 of FIG. 1. In FIG. 17, $\Delta n_2$ and $\Delta n_1$ are selected such that the zero dispersion wavelength becomes 1,560 nm when $a \cdot (\Delta n_2 - \Delta n_1)/(b \cdot \Delta n_2)=0.1$ and b/c=0.25. It can be seen from FIG. 17 that, when the relative refractive index difference $\Delta n_3$ of the third core portion 130 with respect to the cladding portion 200 is 0.03% or greater, a refractive index profile which does not deteriorate the bending loss at a predetermined zero dispersion wavelength can be obtained. By contrast, it can be seen that no advantageous effects over the conventional example can be obtained when $\Delta n_3 < 0.03\%$.

Figure 18:
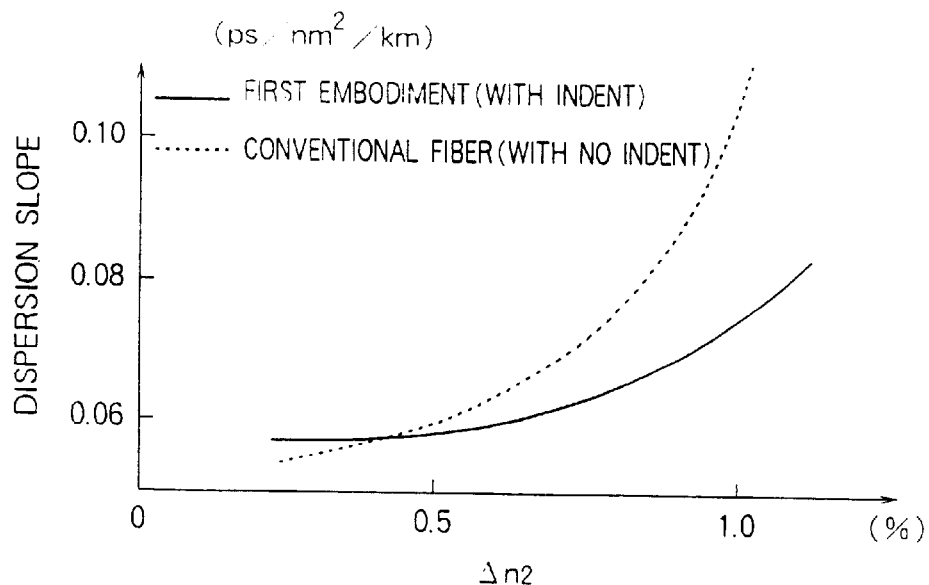
FIG. 18 is a graph showing a relationship between dispersion slope and $\Delta n_2$ in the single-mode optical fiber shown in FIG. 1.

FIG. 18 is a graph showing a relationship between dispersion slope and $\Delta n_2$ in the SM optical fiber 1 shown in FIG. 1. In FIG. 18, $a \cdot (\Delta n_2 - \Delta n_1)/(b \cdot \Delta n_2)=0.3$, b/c=0.25, and $\Delta n_3=0.12\%$. Also, in this graph, the outer diameter c of the third core portion 130 is changed such that the zero dispersion wavelength becomes 1,560 nm, the bending loss becomes not greater than 0.1 dB/m (30 mm$\phi$ bending loss) which is the level where the bending loss is practically free of problems, MFD becomes 8.0 $\mu$m or larger, and the cut-off wavelength becomes 1.5 $\mu$m or less (wherein the ratio of a, b, and c is unchanged). It can be seen from FIG. 18 that the effect of the present invention (due to the fact that the relative refractive index difference at the center part is low) cannot be obtained when $\Delta n_2 < 0.4\%$.

Figure 19:
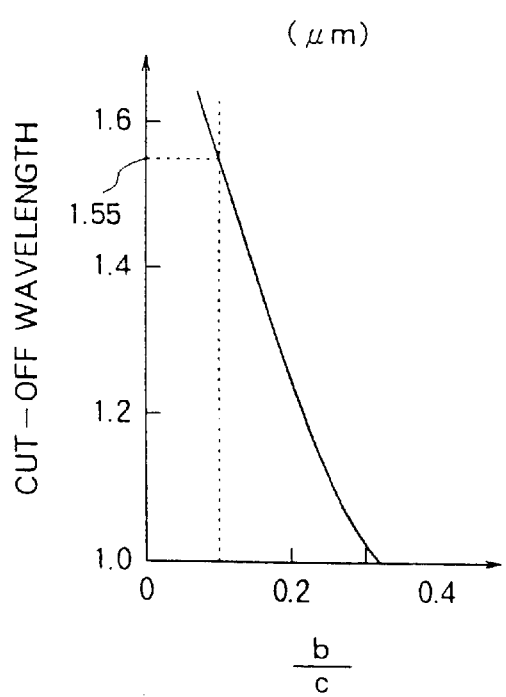
FIG. 19 is a graph showing a relationship between b/c and cut-off wavelength in the single-mode optical fiber shown in FIG. 1.

FIG. 19 is a graph showing a relationship between b/c and cut-off wavelength in the SM optical fiber 1 in accordance with the present invention. In FIG. 19, while $\Delta n_2=1.0\%$, $\Delta n_3=0.12\%$, and $a \cdot (\Delta n_2 - \Delta n_1)/(b \cdot \Delta n_2)=0.3$, a value at which MFD becomes 8.0 $\mu$m is selected as the outer diameter c of the third core portion 130. It can be seen from FIG. 19 that, when b/c<0.1, the cut-off wavelength is longer than the signal light wavelength, thereby deviating from a single-mode condition.

Figure 20:
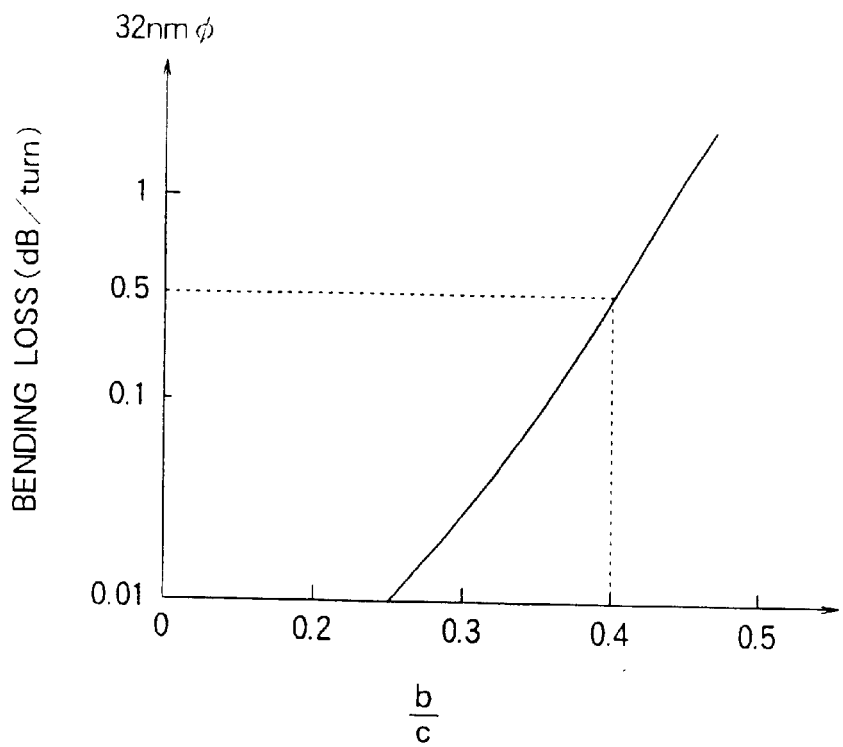
FIG. 20 is a graph showing a relationship between b/c and 32 mm$\phi$ bending loss in the single-mode optical fiber shown in FIG. 1.
Figure 21:
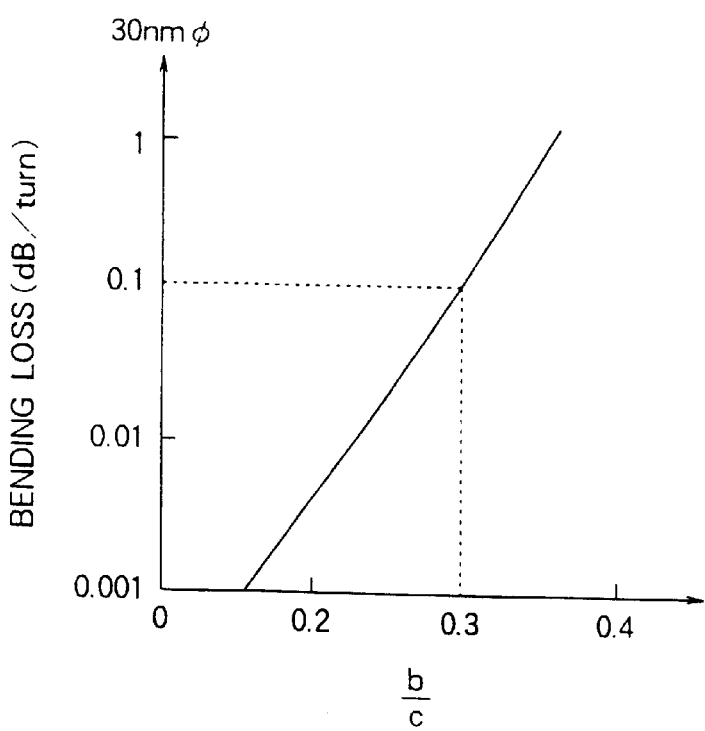
FIG. 21 is a graph showing a relationship between b/c and 30 mm$\phi$ bending loss in the single-mode optical fiber shown in FIG. 1.

Further, FIG. 20 is a graph showing a relationship between b/c and 32 mm$\phi$ bending loss in the SM optical fiber 1 of FIG. 1. Also, FIG. 21 is a graph showing a relationship between b/c and 30 mmφ bending loss in the SM optical fiber 1.

In each of these graphs, while $\Delta n_2=1.0\%$, $\Delta n_3=0.12\%$, and $a\cdot(\Delta n_2-\Delta n_1)/(b\cdot\Delta n_2)=0.3$, a value at which MFD becomes 8.0 μm is selected as the outer diameter c of the third core portion 130. Here, 32 mmφ bending loss is a value (see Bellcore Standard 4.2.6) obtained when an optical fiber to be measured is wound around a mandrel having a diameter of 32 mm for 100 turns and then its transmission loss with respect to light having a wavelength of 1,550 nm is converted into a transmission loss per unit number of turns (one turn). Also, the 30 mmφ bending loss is a value obtained when a mandrel having a diameter of 30 mm is used.

As can be seen from FIG. 20, when b/c exceeds 0.4, the bending loss becomes greater than 0.5 dB/turn, thereby failing to satisfy the above-mentioned Bellcore Standard. Further, in order to make the SM optical fiber applicable to cables of tight structure (30 mmφ bending loss of 0.1 dB/turn or less), it is necessary for b/c to be 0.3 or less as can be seen from FIG. 21.

Figure 22:
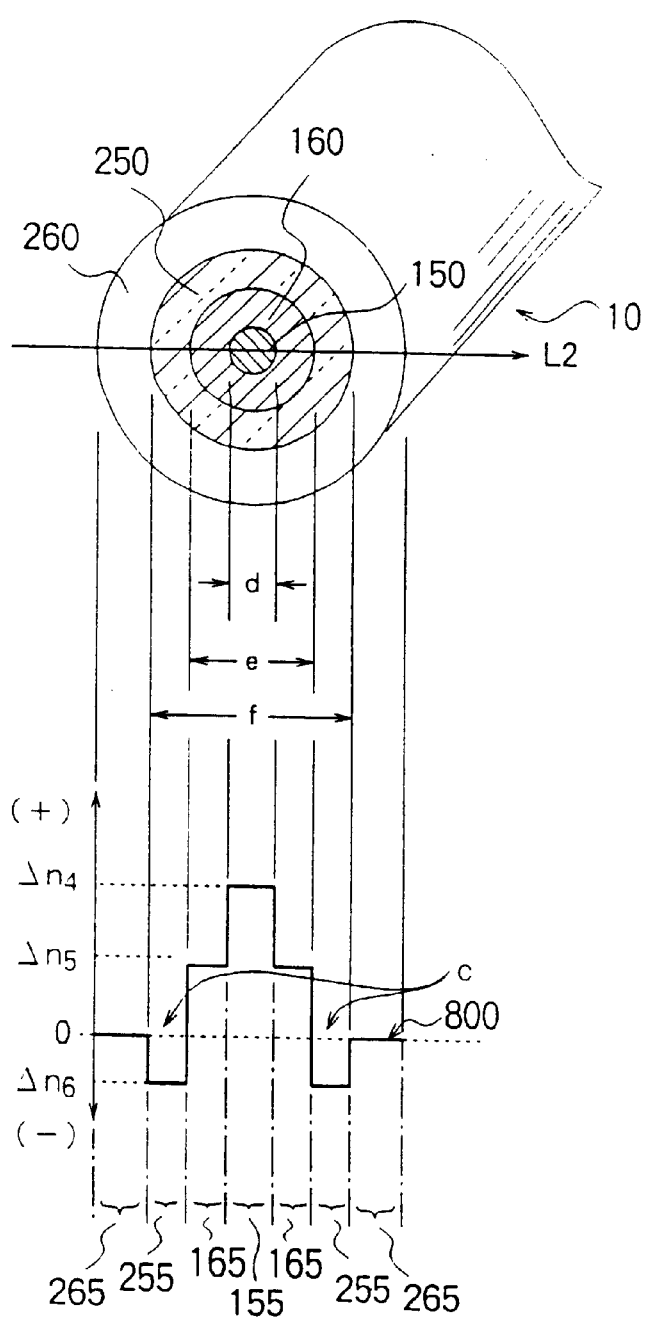
FIG. 22 is a view showing a configuration of a second embodiment of the single-mode optical fiber according to the present invention and a refractive index profile thereof.

FIG. 22 is a view showing a cross-sectional configuration of the second embodiment of the SM optical fiber according to the present invention and a refractive index profile 800 thereof. As shown in FIG. 22, this SM optical fiber 10 comprises an inner core portion 150 having a mean relative refractive index difference with respect to an outer cladding portion 260 of $\Delta n_4$ and an outer diameter of d; an outer core portion 160 formed around the outer periphery of the inner core portion 150, the outer core portion 160 having a mean relative refractive index difference with respect to the outer cladding portion 260 of $\Delta n_3$ ($<\Delta n_4$) and an outer diameter of e; an inner cladding portion 250 formed around the outer periphery of the outer core portion 160, the inner cladding portion 250 having a mean relative refractive index difference with respect to the outer cladding portion 260 of $\Delta n_6$ ($<\Delta n_5$ and $<0$) and an outer diameter of f; and the outer cladding portion 260 having a predetermined refractive index and formed around the outer periphery of the inner cladding portion 250. Here, as can be seen from the above-mentioned definition of the relative refractive index difference, since $\Delta n_6$ is a negative value, the refractive index of the inner cladding portion 250 is set lower than that of the outer cladding portion 260.

Here, the abscissa of the refractive index profile 800 shown in FIG. 22 corresponds to positions on line L2 in a cross section (plane perpendicular to the advancing direction of propagating signal light) of the SM optical fiber 10. Further, in this refractive index profile 800, regions 155, 165, 255, and 265 correspond to relative refractive index differences at positions on the line L2 in the inner core portion 150, outer core portion 160, inner cladding portion 250, and outer cladding portion 260, respectively.

In particular, the SM optical fiber 10 of FIG. 22 satisfies the relationship of $$e\cdot|\Delta n_6|/(f-e)\geq 0.03.$$

Accordingly, a refractive index profile 800 in which an indent C (depression) having a sufficient size is provided can be obtained.

The SM optical fiber 10 in accordance with the second embodiment can be fabricated by well-known MCVD, CVD, or OVD method.

The SM optical fiber 10 of FIG. 22, as in the case of the SM optical fiber 1 of FIG. 1, has a configuration in which the absolute value of gradient of structure dispersion with respect to wavelength decreases such that the dispersion slope is reduced in a wide wavelength range. The effect on lowering the dispersion slope becomes greater as the width (f−e) of the inner cladding portion 250 is smaller or the difference between $\Delta n_6$ ($<0$) and $\Delta n_4$ or between $\Delta n_6$ and $\Delta n_5$ is larger.

Figure 23:
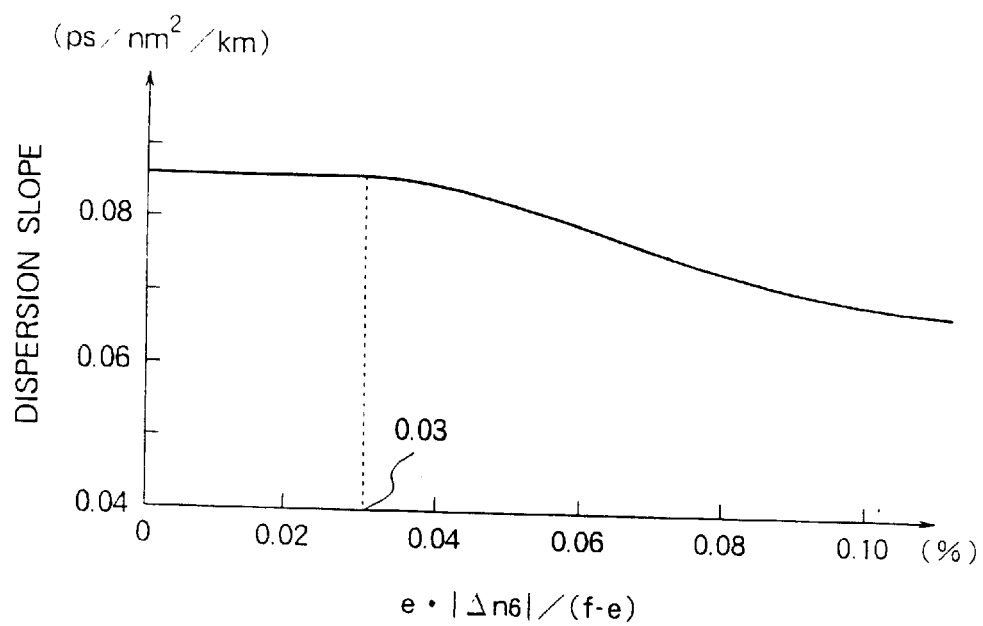
FIG. 23 is a graph showing a relationship between dispersion slope and $e \cdot |\Delta n_6|/(f-e)$ in the single-mode optical fiber shown in FIG. 22.

FIG. 23 is a graph showing a relationship between dispersion slope and $e\cdot|\Delta n_6|/(f-e)$ in the SM optical fiber 10. In FIG. 23, while $\Delta n_4=0.9\%$, $\Delta n_5=0.10\%$, and d/e=0.28, the outer diameter e of the outer core portion 160 is set so that MFD becomes 8.0 μm. It can be seen from FIG. 23 that, when $e\cdot|\Delta n_6|/(f-e)<0.03$, the effect on lowering the dispersion slope obtained by the SM optical fiber of this embodiment over the conventional SM optical fiber (wherein $|\Delta n_6|=\Delta n_5$; i.e., there is no inner cladding portion) is quite small.

Figure 24:
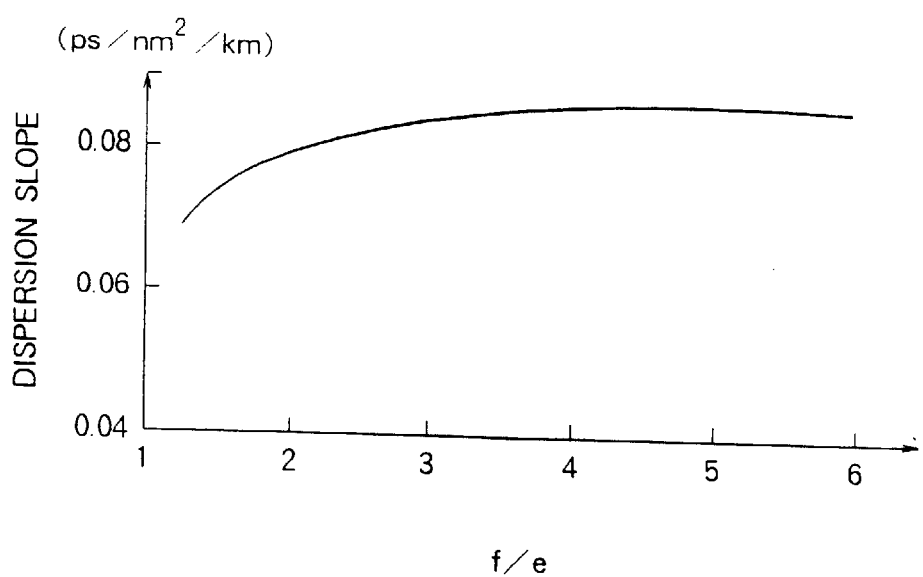
FIG. 24 is a graph showing a relationship between dispersion slope and f/e when $e \cdot \Delta n_6/(f-e)=0$ in the single-mode optical fiber shown in FIG. 22.

FIG. 24 is a graph showing a relationship between dispersion slope and f/e when $e\cdot|\Delta n_6|/(f-e)=0.06$. In FIG. 24, while $\Delta n_4=0.9\%$, $\Delta n_5=0.10\%$, and d/e=0.28, the outer diameter e of the outer core portion 160 is set so that MFD becomes 8.0 μm. It can be seen from FIG. 24 that, in the case where f/e>4, the effect on lowering the dispersion slope can hardly be obtained even when the absolute value of relative refractive index difference $\Delta n_6$ is made small so as to constantly hold the value of $e\cdot|\Delta n_6|/(f-e)$.

As explained in detail in the foregoing, since the SM optical fiber in accordance with the present invention has a refractive index profile in which an indent (well) with sufficient width and depth is provided at the center part of the core, the absolute value of gradient of structure dispersion with respect to wavelength decreases, so that the dispersion slope can be reduced in a wide wavelength range. As a result, in a WDM transmission system having a plurality of signal light wavelengths, difference in dispersion value among these wavelengths can be suppressed, thereby enabling dispersion compensation advantageously. Also, in normal transmission of a single signal light wavelength, it is particularly effective in lowering the dispersion slope when the zero dispersion wavelength and the signal light wavelength deviate from each other or when the zero dispersion wavelength fluctuates in the longitudinal direction (advancing direction of the signal light).

Also, in the manufacturing method of SM optical fiber in accordance with the present invention, since a refractive index profile having an indent with sufficient width and depth at the center of the core region can be intentionally realized, the SM optical fiber according to the present invention can be suitably manufactured.

Further, in the SM optical fiber of the second embodiment, since the refractive index of the inner cladding portion having an appropriate width is made lower than that of the outer cladding portion by a predetermined level, the gradient (absolute value) of structure dispersion with respect to wavelength decreases, so that the dispersion slope can be reduced. As a result, in a WDM transmission system having a plurality of signal light wavelengths, difference in dispersion value among these wavelengths can be suppressed, thereby enabling dispersion compensation advantageously. Also, in normal transmission of a single signal light wavelength, it is particularly effective in lowering the dispersion slope when the zero dispersion wavelength and the signal light wavelength deviate from each other or when the zero dispersion wavelength fluctuates in the longitudinal direction (advancing direction of the signal light).

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

The basic Japanese Application No. 257843/1995 filed on Oct. 4, 1995 is hereby incorporated by reference.

What is claimed is:

1. A method of fabricating a single-mode fiber mainly composed of silica glass comprising, at least, a first core portion, a second core portion formed around an outer periphery of said first core portion, a third core portion formed around an outer periphery of said second core portion, and a cladding portion formed around an outer periphery of said third core portion, said method comprising:

a first step of forming a first soot body to be said first and second core portions after vitrification around an outer periphery of a cylindrical glass rod, said first core portion having a mean relative refractive index difference with respect to said cladding portion of a first value $\Delta n_1$, said second core portion having a mean relative refractive index difference with respect to said cladding portion of a second value $\Delta n_2$ greater than said first value $\Delta n_1$;

a second step of forming a second soot body to be said third core portion after vitrification around an outer periphery of said first soot body, said third core portion having a mean relative refractive index difference with respect to said cladding portion of a third value $\Delta n_3$ greater than said second value $\Delta n_2$;

a third step of forming a third soot body to be said cladding portion having a predetermined refractive index after vitrification around an outer periphery of said second soot body;

a fourth step of pulling out said glass rod and flowing a halogen gas flow through a hollow part of a tubular soot body composed of said first, second and third soot bodies, while heating said tubular soot body, thereby diffusing germanium contained in an inner surface side of said first soot body so as to reduce the germanium concentration of the inner surface side of said first soot body as compared with that of the second soot body side of said first soot body;

a fifth step of heating and collapsing said tubular soot body composed of said first soot body having different germanium concentrations respectively on the inner surface side and second soot body side thereof, second soot body and third soot body thereby obtaining a transparent optical fiber preform; and a sixth step of drawing one end of said optical fiber preform obtained at said fifth step, while heating said one end, so as to yield a single-mode optical fiber having at least said first core portion of an outer diameter a, said second core portion of an outer diameter b and said third core portion of an outer diameter c, wherein said second step includes:

a first sub-process of forming an inner soot body to be an inner core of said third core portion after vitrification around the outer periphery of said first soot body, said inner core being positioned around the outer periphery of said second core portion and having a mean relative refractive index difference with respect to said cladding portion of a fourth value $\Delta n_{3a}$ smaller than the second value $\Delta n_2$; and a later process of forming an outer soot body to be an outer core of said third core portion after vitrification around an outer periphery of said inner soot body, said outer core being positioned around an outer periphery of said inner core and having a mean relative refractive index difference with respect to said cladding portion of a fifth value $\Delta n_{3b}$ greater than the fourth value $\Delta n_{3a}$ and smaller than the second value $\Delta n_2$, and wherein, in said sixth step, said optical fiber perform obtained at said fifth step is drawn so as to yield a single-mode optical fiber in which said inner and outer cores of said third core portion have outer diameters of $c_a$ and c, respectively, and said inner and outer cores satisfy the following relationship:

$$0.1 \leq (c_a - b) \cdot (\Delta n_{3b} - \Delta n_{3a}) / (c \cdot \Delta n_{3b}) \leq 0.8$$

therebetween.

* * * * *